United States Patent
Nishizaki

(10) Patent No.: US 10,917,383 B2
(45) Date of Patent: Feb. 9, 2021

(54) MANAGEMENT SYSTEM INCLUDING FIRST AND SECOND INFORMATION-PROCESSING APPARATUSES CONNECTED TO EACH OTHER VIA FIREWALL

(71) Applicant: BROTHER KOGYO KABUSHIKI KAISHA, Aichi (JP)

(72) Inventor: Takashi Nishizaki, Nagoya (JP)

(73) Assignee: Brother Kogyo Kabushiki Kaisha, Aichi (JP)

( * ) Notice: Subject to any disclaimer, the term of this patent is extended or adjusted under 35 U.S.C. 154(b) by 119 days.

(21) Appl. No.: 16/382,309

(22) Filed: Apr. 12, 2019

(65) Prior Publication Data

US 2019/0319921 A1    Oct. 17, 2019

(30) Foreign Application Priority Data

Apr. 13, 2018 (JP) ................................ 2018-077442

(51) Int. Cl.
*G06F 17/00* (2019.01)
*G06F 15/16* (2006.01)
(Continued)

(52) U.S. Cl.
CPC ............ *H04L 63/0209* (2013.01); *G06F 8/61* (2013.01); *H04L 67/34* (2013.01)

(58) Field of Classification Search
CPC ........ H04L 63/0209; H04L 67/34; G06F 8/61
(Continued)

(56) References Cited

U.S. PATENT DOCUMENTS 7,448,081 B2 * 11/2008 Balissat .............. H04L 63/0209
726/15
7,480,936 B2 * 1/2009 Lyon ................... H04L 63/0272
705/51

(Continued)

FOREIGN PATENT DOCUMENTS

JP          2017-536598 A     12/2017

*Primary Examiner* — Monjur Rahim
(74) *Attorney, Agent, or Firm* — Scully, Scott, Murphy & Presser, PC

(57) ABSTRACT

A management system includes: a first information-processing apparatus connected with the Internet; and a second information-processing apparatus connected with a local network connected to the Internet via a firewall. The first information-processing apparatus transmits communication information and an installer to a request source that has transmitted an installer request. After the mediation program is installed on the second information-processing apparatus, a specific communication mode in which the firewall allows transmission of a specific command from the first information-processing apparatus to the second information-processing apparatus is started using the communication information. The specific command includes a specific instruction for a device connected with the second information-processing apparatus via the local network. The specific command is generated independently of requests that the second information-processing apparatus transmits. Under the specific communication mode, the first information-processing apparatus transmits the specific command to the second information-processing apparatus via the firewall.

15 Claims, 8 Drawing Sheets

(51) Int. Cl.
*G06F 9/00* (2006.01)
*H04L 29/06* (2006.01)
*G06F 8/61* (2018.01)
*H04L 29/08* (2006.01)

(58) Field of Classification Search
USPC .................................................. 726/11
See application file for complete search history.

(56) References Cited

U.S. PATENT DOCUMENTS

| | | | | |
|---|---|---|---|---|
| 7,886,349 | B2* | 2/2011 | Taglienti | H04L 63/0254 726/11 |
| 8,176,543 | B2* | 5/2012 | Baker | H04L 63/0263 726/11 |
| 8,719,811 | B2* | 5/2014 | Vulugundam | H04N 1/00323 717/173 |
| 2002/0157020 | A1* | 10/2002 | Royer | H04L 63/1425 726/11 |
| 2009/0165132 | A1* | 6/2009 | Jain | G06F 21/51 726/22 |
| 2011/0162060 | A1* | 6/2011 | Vijayakumar | H04L 12/413 726/13 |
| 2013/0198829 | A1* | 8/2013 | Bund | H04L 63/029 726/11 |
| 2015/0033305 | A1* | 1/2015 | Shear | G06F 21/53 726/6 |
| 2016/0085533 | A1 | 3/2016 | Jayanti et al. | |
| 2016/0087854 | A1 | 3/2016 | Jayanti et al. | |
| 2016/0087955 | A1 | 3/2016 | Mohamad et al. | |
| 2016/0087956 | A1 | 3/2016 | Maheshwari et al. | |
| 2016/0088021 | A1 | 3/2016 | Jayanti et al. | |
| 2016/0088026 | A1 | 3/2016 | Mohamad et al. | |
| 2018/0025135 | A1* | 1/2018 | Odom | H04L 63/08 726/28 |

* cited by examiner

FIG. 2A

FIRST TABLE OF CORRELATION DATABASE

| DEVICE ID | GUID | LOCATION INFO | FIRMWARE VERSION | SETTINGS INFORMATION | | | | MODIFIED DATE | CONDITION INFO | COMMUNICATION START INFO | |
|---|---|---|---|---|---|---|---|---|---|---|---|
| | | | | FONT | FONT SIZE | DENSITY | ... | | | | |
| 001 | 00A | A BRANCH OFFICE | 2 | GOTHIC | 14 | 3 | ... | 2018.04.01 | MANAGING | READY | ... |
| 002 | 00A | A BRANCH OFFICE | 3 | GOTHIC | 14 | 3 | ... | 2018.04.03 | MANAGING | READY | ... |
| 003 | 00A | A BRANCH OFFICE | 2 | GOTHIC | 14 | 3 | ... | 2018.04.02 | MANAGING | READY | ... |
| 004 | 00B | B BRANCH OFFICE | 2 | GOTHIC | 12 | 2 | ... | 2018.04.02 | MANAGING | READY | ... |
| 005 | 00B | B BRANCH OFFICE | 2 | GOTHIC | 12 | 2 | ... | 2018.04.03 | MANAGING | READY | ... |
| 006 | 00C | C BRANCH OFFICE | 1 | MINCHO | 12 | 2 | ... | 2018.04.02 | MANAGING | READY | ... |
| 008 | 00C | C BRANCH OFFICE | 2 | MINCHO | 12 | 2 | ... | 2018.04.02 | MANAGING | READY | ... |
| 009 | 00C | C BRANCH OFFICE | - | - | - | - | ... | - | WAITING | READY | ... |
| ... | ... | ... | ... | ... | ... | ... | ... | ... | ... | ... | ... |

SECOND TABLE OF CORRELATION DATABASE  TB2

| GUID | LOCATION INFO | COMMUNICATION START INFO | INSTALLER DOWNLOAD DATE | INSTALLATION DATE |
|---|---|---|---|---|
| 00A | A BRANCH OFFICE | PENDING | 2018.04.03 | – |
| 00B | B BRANCH OFFICE | PENDING | 2018.04.02 | – |
| 00C | C BRANCH OFFICE | READY | 2018.04.01 | 2018.04.01 |
| ⋮ | ⋮ | ⋮ | ⋮ | ⋮ |

FIG. 2C

THIRD TABLE OF CORRELATION DATABASE  TB3

| GUID | LOCATION INFO | COMMUNICATION START INFO | INSTALLER DOWNLOAD DATE | INSTALLATION DATE |
|---|---|---|---|---|
| 00A | A BRANCH OFFICE | – | – | – |
| 00B | B BRANCH OFFICE | PENDING | 2018.04.02 | – |
| 00C | C BRANCH OFFICE | READY | 2018.04.01 | 2018.04.01 |
| ⋮ | ⋮ | ⋮ | ⋮ | ⋮ |

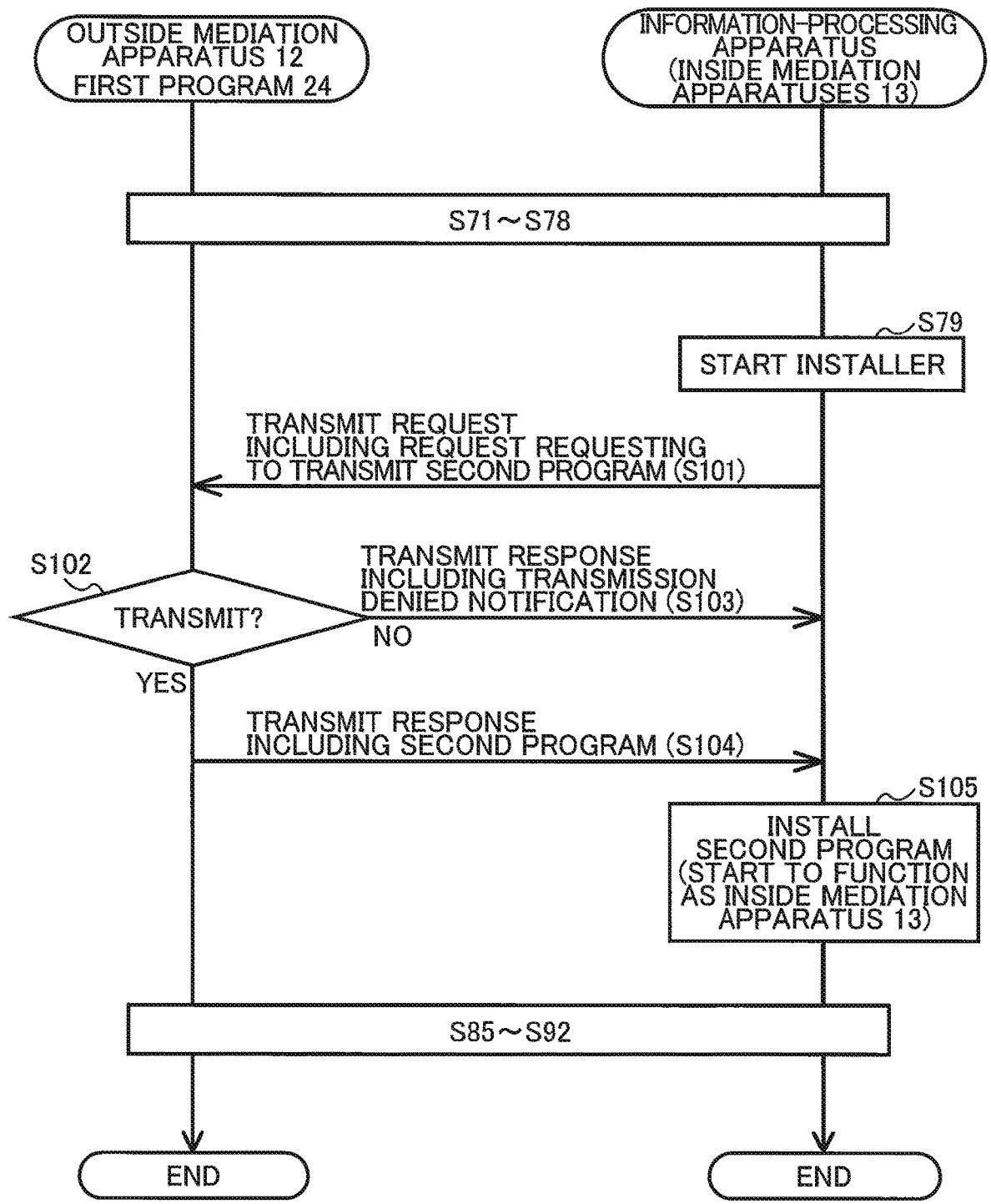

MANAGEMENT SYSTEM INCLUDING FIRST AND SECOND INFORMATION-PROCESSING APPARATUSES CONNECTED TO EACH OTHER VIA FIREWALL

CROSS REFERENCE TO RELATED APPLICATION

This application claims priority from Japanese Patent Application No. 2018-077442 filed Apr. 13, 2018. The entire content of the priority application is incorporated herein by reference.

TECHNICAL FIELD

The present disclosure relates to a management system for managing devices, a non-transitory computer-readable storage medium storing computer-readable instructions for managing devices, and a method for managing devices.

BACKGROUND

There has been known a conventional mobile device management (abbreviated herein as "MDM") system including a management server on the Internet that communicates with and manages mobile devices. For example, the mobile devices are terminal devices that capable of connecting directly to the Internet and communicating with the management server. Examples of the terminal devices include mobile phones, tablets, and notebook type personal computers.

SUMMARY

However, the conventional technology does not sufficiently describe how the MDM system manages devices that do not communicate directly with the management server.

In view of the foregoing it is an object of the present disclosure to provide a technique of managing devices that do not communicate directly with a management server.

In order to attain the above and other objects, according to one aspect, the present disclosure provides a management system including a first information-processing apparatus and a second information-processing apparatus. The first information-processing apparatus is configured to connect with the Internet and includes a first controller. The second information-processing apparatus is configured to connect with a local network and includes a second controller. The local network is connected to the Internet via a firewall. The first controller is configured to perform: (a1) receiving an installer request requesting an installer for installing a mediation program; (a2) acquiring an address of the first information-processing apparatus; and (a3) transmitting, in response to performing the (a1) receiving, set information to a request source apparatus which has issued the installer request, the set information including: communication information including the address acquired in the (a2) acquiring; and installer information representing the installer. After the first controller performs the (a3) transmitting, the mediation program is installed on the second information-processing apparatus by the installer represented by the installer information included in the set information transmitted in the (a3) transmitting. After the mediation program is installed on the second information-processing apparatus, a specific communication mode is started using the communication information included in the set information transmitted in the (a3) transmitting. The specific communication mode is a communication mode in which the firewall allows transmission of a specific command from the first information-processing apparatus to the second information-processing apparatus. The specific command includes a specific instruction for a device configured to connect with the second information-processing apparatus via the local network. The specific command is generated independently of requests that the second information-processing apparatus transmits. The first controller is configured to further perform: (a4) transmitting, under the specific communication mode, the specific command to the second information-processing apparatus via the firewall. The second controller is configured to perform: (b1) receiving, under the specific communication mode, the specific command via the firewall; and (b2) transmitting, in response to performing the (b1) receiving, a specific response to the specific command to the first information-processing apparatus via the firewall. The first controller is configured to further perform: (a5) receiving the specific response from the second information-processing apparatus via the firewall.

According to another aspect, the present disclosure provides a non-transitory computer-readable storage medium storing computer-readable instructions for a first information-processing apparatus. The first information-processing apparatus is configured to connect with the Internet and includes a processor. The computer-readable instructions, when executed by the processor, causes the first information-processing apparatus to perform: (a1) receiving an installer request requesting an installer for installing a mediation program on a second information-processing apparatus, the second information-processing apparatus being configured to connect with a local network, the local network being connected to the Internet via a firewall; (a2) acquiring an address of the first information-processing apparatus; and (a3) transmitting, in response to performing the (a1) receiving, set information to a request source apparatus which has issued the installer request, the set information including: communication information including the address acquired in the (a2) acquiring; and installer information representing the installer. After the first controller performs the (a3) transmitting, the mediation program is installed on the second information-processing apparatus by the installer represented by the installer information included in the set information transmitted in the (a3) transmitting. After the mediation program is installed on the second information-processing apparatus, a specific communication mode is started using the communication information included in the set information transmitted in the (a3) transmitting. The specific communication mode is a communication mode in which the firewall allows transmission of a specific command from the first information-processing apparatus to the second information-processing apparatus. The specific command includes a specific instruction for a device configured to connect with the second information-processing apparatus via the local network. The specific command is generated independently of requests that the second information-processing apparatus transmits. The first controller is configured to further perform: (a4) transmitting, under the specific communication mode, the specific command to the second information-processing apparatus via the firewall; and (a5) receiving a response to the specific command from the second information-processing apparatus via the firewall.

According to still another aspect, the present disclosure provides a method for managing a device. The method includes: under control of a first information-processing apparatus configured to connect with the Internet, (a1) receiving, an installer request requesting an installer for installing a mediation program on a second information-processing apparatus, the second information-processing apparatus being configured to connect with a local network, the local network being connected to the Internet via a firewall; (a2) acquiring an address of the first information-processing apparatus; (a3) transmitting, in response to performing the (a1) receiving, set information to a request source apparatus which has issued the installer request, the set information including: communication information including the address acquired in the (a2) acquiring; and installer information representing the installer, wherein, after the first controller performs the (a3) transmitting, the mediation program is installed on the second information-processing apparatus by the installer represented by the installer information included in the set information transmitted in the (a3) transmitting, wherein, after the mediation program is installed on the second information-processing apparatus, a specific communication mode is started using the communication information included in the set information transmitted in the (a3) transmitting, the specific communication mode being a communication mode in which the firewall allows transmission of a specific command from the first information-processing apparatus to the second information-processing apparatus, the specific command including a specific instruction for a device configured to connect with the second information-processing apparatus via the local network, the specific command being generated independently of requests that the second information-processing apparatus transmits; (a4) transmitting, under the specific communication mode, the specific command to the second information-processing apparatus via the firewall; and (a5) receiving a response to the specific command from the second information-processing apparatus via the firewall.

BRIEF DESCRIPTION OF THE DRAWINGS

The particular features and advantages of the embodiment(s) as well as other objects will become apparent from the following description taken in connection with the accompanying drawings, in which:

FIG. 2A illustrates a first table of a correlation database stored in a data storage area of an outside mediation apparatus in the management system according to the embodiment;

FIG. 2B illustrates a second table of the correlation database in the data storage area of the outside mediation apparatus in the management system according to the embodiment;

FIG. 2C illustrates a third table of a correlation database in a data storage area of an outside mediation apparatus in a management system according to a first variation;

FIG. 7 is a sequence diagram illustrating a process executed by an outside mediation apparatus and an inside mediation apparatus in a management system according to a second variation of the embodiment, and the process is executed for downloading an installer and a second program to the inside mediation apparatus and installing the second program on the inside mediation apparatus using the installer.

DETAILED DESCRIPTION

An embodiment will be described while referring to the accompanying drawings. It would be apparent to those skilled in the art that the embodiment described below is merely an example of the present disclosure, and modifications and variations may be made to the embodiment. For example, the order for executing the processes described below may be appropriately modified.

Figure 1:
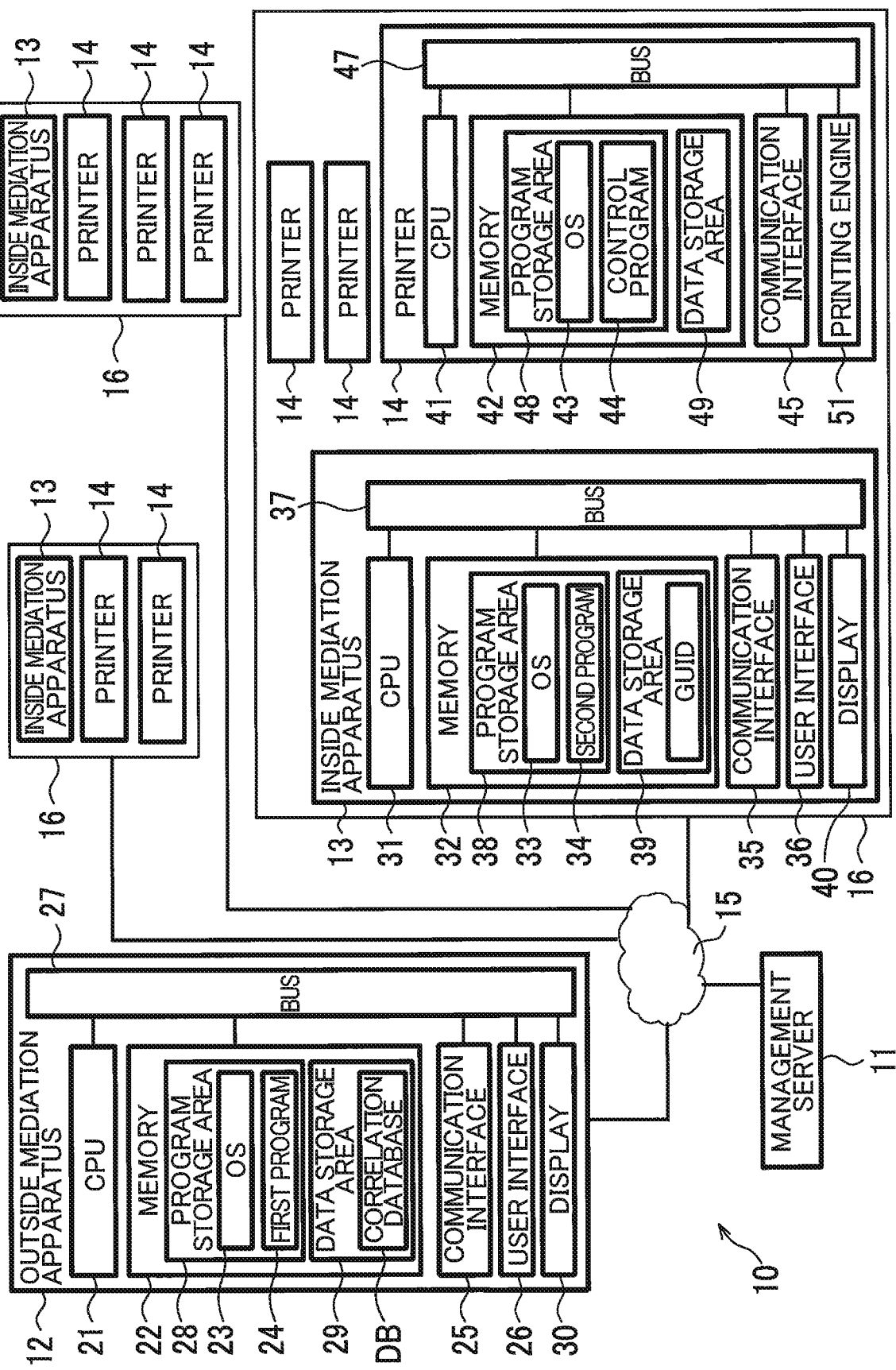
FIG. 1 is a conceptual diagram illustrating a configuration of a management system according to one embodiment of the present disclosure.

FIG. 1 illustrates a management system 10 according to the embodiment. As illustrated in FIG. 1, the management system 10 includes a management server 11, an outside mediation apparatus 12 on which a first program 24 is installed, inside mediation apparatuses 13 on each of which a second program 34 is installed, and printers 14. The management server 11 and the outside mediation apparatus 12 are connected to the Internet 15. The inside mediation apparatuses 13 and the printers 14 are connected to local area networks 16. Each of the local area networks 16 is an example of the claimed "local network." Each of the second programs 34 is an example of the claimed "mediation program."

The management system 10 employs a so-called mobile device management system (abbreviated herein as "MDM system") to manage the printers 14. An administrator of the printers 14 can view, using a browser, management information on the printers 14 stored on the management server 11, or can instruct the printers 14 to change or the like to their settings for the printers 14 through the management server 11.

In the management system 10, the management server 11 uses the outside mediation apparatus 12 and the inside mediation apparatuses 13 to manage the printers 14 which do not have a function to communicate directly with the management server 11 (for example, a function to connect to the Internet 15).

The management server 11 is, for example, a server possessed by a company that provides a service for managing mobile devices (hereinafter, sometimes referred to as "MDM service"). The outside mediation apparatus 12 is, for example, a sever possessed by a company that uses this MDM service. The inside mediation apparatuses 13 are, for example, servers or personal computers deployed at branch offices of the company utilizing the MDM service. For example, the local area network 16 is configured at each of these company branches. Each branch office possesses one or more printers 14. The printers 14 at each branch are connected to the local area network 16 provided at that branch. The outside mediation apparatus 12 is an example of the claimed "first information-processing apparatus." Each of the inside mediation apparatuses 13 is an example of the claimed "second information-processing apparatus." Each of the printers 14 is an example of the claimed "device."

In the example illustrated in FIG. 1, three local area networks 16 are configured at corresponding branches and two or three printers 14 are connected to each of the three local area network 16. However, the number of local area networks 16 included in the management system 10 and the number of printers 14 connected to each local area network 16 are not limited to the numbers in this example.

The management server 11 and the outside mediation apparatus 12 can communicate with each other through the Internet 15. More specifically, the management server 11 and the outside mediation apparatus 12 each have a global IP address and communicate with each other using the Internet Protocol which employs global IP addresses.

The local area network 16 is an intranet that is configured of a wired LAN, wireless LAN, WAN, or a combination of these, for example. The inside mediation apparatus 13 and the printers 14 connected to each local area network 16 can communicate with each other using a communication protocol such as TCP/IP. More specifically, the inside mediation apparatus 13 and the printers 14 communicate with each other using private IP addresses or MAC addresses.

Each local area network 16 has a gateway device (not shown) such as a router. The gateway device has a global IP address and is connected to the Internet 15. The inside mediation apparatuses 13 connected to each local area network 16 communicates with the outside mediation apparatus 12 via the gateway device. Specifically, the inside mediation apparatuses 13 and the outside mediation apparatus 12 communicate with each other through a firewall configured by the gateway device.

Here, the outside mediation apparatus 12 is a mediation apparatus located outside the firewall and the inside mediation apparatus 13 is a mediation apparatus located inside the firewall. In this example, the inside mediation apparatuses 13 are local mediation apparatuses located in the local area networks 16 for mediating communications between the outside mediation apparatus 12 and the printers 14 located in the local area networks 16, whereas the outside mediation apparatus 12 is a global mediation apparatus for mediating communications between the management server 11 and the inside mediation apparatuses 13.

In the management system 10, management by the management server 11 of the printers 14 that do not possess a function for communicating directly with the management server 11 (for example, a function for connecting to the Internet 15) is implemented by the outside mediation apparatus 12 on which the first program 24 is installed and the inside mediation apparatuses 13 on each of which the second program 34 is installed. Next, the structures of the outside mediation apparatus 12, the inside mediation apparatuses 13, and the printers 14 will be described in detail.

The outside mediation apparatus 12 is provided with a CPU 21, a memory 22, a communication interface 25, a user interface 26, a communication bus 27, and a display 30. The CPU 21, the memory 22, the communication interface 25, the user interface 26, and display 30 are connected to the communication bus 27. The CPU 21 is an example of the claimed "first controller" and is also an example of the claimed "processor."

The memory 22 may be configured of ROM, RAM, EEPROM, a hard disk drive, a portable storage medium such as USB memory, or a buffer provided in the CPU 21. The memory 22 may be a non-transitory storage medium that can be read by a computer. In other words, the memory 22 may be any non-transitory computer-readable storage medium. In addition to the above examples, examples of the non-transitory storage medium include CD-ROM and DVD-ROM. The non-transitory storage medium is a tangible medium. On the other hand, electric signals that convey programs downloaded from a server or the like on the Internet are a computer-readable signal medium, which is one type of computer-readable medium but is not considered a non-transitory computer-readable storage medium. This description also applies to a memory 32 provided in the inside mediation apparatus 13 described later and a memory 42 provided in the printer 14 described later.

The memory 22 has a program storage area 28, and a data storage area 29. The program storage area 28 stores an operating system (hereinafter, abbreviated as "OS") 23, a first program 24, and other programs.

The OS 23 is a basic program of the outside mediation apparatus 12. The OS 23 is any operating system such as Mac OS (registered trademark), Windows (registered trademark), Linux (registered trademark), or Android (registered trademark).

The first program 24 is a program for controlling, in cooperation with the OS 23, communications with the management server 11 and the inside mediation apparatuses 13 via the communication interface 25. The first program 24 may be a single program or an aggregate of programs. The process executed by the first program 24 will be described later.

The data storage area 29 stores data required for executing programs. The data storage area 29 also stores a correlation database DB includes a first table TB1 shown in FIG. 2A and a second table TB2 shown FIG. 2B. The first table TB1 is used mainly for managing the printers 14. The second table TB2 is used mainly for managing the inside mediation apparatuses 13.

As shown in FIG. 2A, the first table TB1 of the correlation database DB has a plurality of records, each of which is a collection of a plurality of fields. The plurality of fields correspond to respective ones of a plurality of items including the items "Device ID," "GUID (the abbreviation of "Globally Unique Identifier")," "Location Information," "Firmware Version," "Font" under "Settings Information," "Font Size" under "Settings Information," "Density" under "Settings Information," "Modified Date," and "Condition Information," and "Communication Start Information." Each of the plurality of records in the first table TB1 may include fields corresponding to items other than those described above. Hereinafter, each of the plurality of fields will be sometimes referred to by the name of the corresponding item.

The item "Device ID" specifies identification information (i.e., an ID) assigned to the printer 14 for identifying the printer 14. The device ID may be a MAC address, an IP address, or a serial number for the printer 14, for example. The device ID is used to differentiate individual records in the first table TB1. In other words, a single record is generated for each printer 14.

The item "GUID" specifies the inside mediation apparatus 13 to which the printer 14 identified by the device ID belongs. "The inside mediation apparatus 13 to which the printer 14 belongs" denotes the inside mediation apparatus 13 that is connected to the same local area network 16 to which the printer 14 identified by the device ID is connected. In other words, the item "GUID" is identification information (i.e., an ID) assigned to the second program 34 for identifying the second program 34. Note that a single second program 34 is installed for each inside mediation apparatuses 13. Therefore, the GUID may also be considered identification information (i.e., an ID) assigned to the inside mediation apparatus 13. Here, numbers, letters, or any other characters or the like capable of identifying the inside mediation apparatus 13 may be used as the GUID. The same is true for the device ID.

The item "Location Information" specifies the local area network 16 to which the inside mediation apparatus 13 identified by the item "GUID" belongs. The item "Location Information" may be a branch name or branch office name, for example. The location information may also be text information such as text "A branch" or the global IP address assigned to the gateway device in the local area network 16 to which the inside mediation apparatus 13.

The item "Firmware Version" specifies the version of a control program 44 (described later) installed on the printer 14. Larger numbers in the item "Firmware Version" indicate newer versions.

The item "Settings Information" specifies parameters set for the printer 14. The item "Settings Information" is subdivided into a plurality of items including "Font," "Font Size," and "Density." The item "Font" indicates the font for characters printed by the printer 14. The item "Font Size" indicates the size of characters printed by the printer 14. The item "Density" indicates the density of ink that the printer 14 uses to print text and graphics. In addition to these items, the item "Settings Information" may include other items, such as an item specifying whether the automatic power-off function is enabled or disabled, an item specifying the printing speed, and an item specifying settings parameters for communication.

The item "Modified Date" indicates the date on which content for any item in the record is last modified. The plurality of items may include "Modified Date and Time" instead of "Modified Date". In this case, the item "Modified Date and Time" indicates the date and time at which content for any item in the record was last updated.

The item "Condition Information" indicates whether the printer 14 corresponding to the record is under management of the management system 10. For this item, "Managing" denotes that the printer 14 is currently under the management of the management system 10, while "Waiting" denotes that the printer 14 is not currently under the management of the management system 10.

The item "Communication Start Information" indicates whether the inside mediation apparatus 13 corresponding to the record has been registered in the correlation database DB. Specifically, this item indicates whether the second program 34 has been installed on the corresponding inside mediation apparatus 13 and the first program 24 of the outside mediation apparatus 12 has accepted registration of the second program 34 installed on the inside mediation apparatus 13. The value "Ready" denotes that the first program 24 has accepted registration of the second program 34, while the value "Pending" denotes that the first program 24 has not yet accepted the registration of the second program 34.

While this will be described later in greater detail, when the value "Ready" is recorded under item "Communication Start Information" for a second program 34 (i.e., an inside mediation apparatus 13), the first program 24 of the outside mediation apparatus 12 transmits an instruction to the second program 34 to begin transmitting periodic HTTP requests. Hence, the item "Communication Start Information" indicates whether periodic communications have begun between the outside mediation apparatus 12 and inside mediation apparatus 13. Note that the second table TB2 of the correlation database DB will be described later in detail.

The communication interface 25 of the outside mediation apparatus 12 shown in FIG. 1 can communicate with the management server 11 and the inside mediation apparatus 13. The communication interface 25 is a LAN interface or a wireless LAN interface. The outside mediation apparatus 12 communicates with the inside mediation apparatus 13 via the communication interface 25, the Internet 15, the firewall, the local area network 16, and a communication interface 35 (described later) of the inside mediation apparatus 13.

The user interface 26 includes a keyboard, mouse, and the like. The user interface 26 receives input from the administrator of the outside mediation apparatus 12.

Each of the inside mediation apparatuses 13 is provided with a CPU 31, a memory 32, a communication interface 35, a user interface 36, a communication bus 37, and a display 40. The structures of the CPU 31, the memory 32, the communication interface 35, the user interface 36, the communication bus 37, and the display 40 are identical to those of the CPU 21, the memory 22, the communication interface 25, the user interface 26, the communication bus 27, and the display 30. The CPU 31 is an example of the claimed "second controller."

The memory 32 has a program storage area 38, and a data storage area 39. The program storage area 38 stores programs, such as an OS 33 and a second program 34. The data storage area 39 stores data required for executing the programs. As will be described later, the inside mediation apparatus 13 stores, in the data storage area 39, a GUID transmitted in S78 from the outside mediation apparatus 12.

The OS 33 is a basic program for the inside mediation apparatus 13. The second program 34 is a program for controlling, in cooperation with the OS 33, communications with the outside mediation apparatus 12 and the printers 14 via the communication interface 35. The second program 34 may be a single program or an aggregate of programs. The process executed by the second program 34 will be described later.

The communication interface 35 can communicate with the outside mediation apparatus 12 and the printers 14. The communication interface 35 is a LAN interface or a wireless LAN interface.

Each of the printers 14 is provided with a CPU 41, a memory 42, a communication interface 45, a printing engine 51, and a communication bus 47. The CPU 41, the memory 42, the communication interface 45, and the communication bus 47 have the same structures as the CPU 21, the memory 22, the communication interface 25, and the communication bus 27.

The memory 42 has a program storage area 48, and a data storage area 49. The program storage area 48 stores programs such as an OS 43, and a control program 44. The data storage area 49 stores data required for executing the programs. The data storage area 49 also stores a device ID for identifying the printer 41.

The OS 43 is a basic program for the printer 14. The control program 44 is a program for controlling, in cooperation with the OS 43, the printing engine 51 to execute printing operations and also controlling communications with the inside mediation apparatus 13 via the communication interface 45. The control program 44 may be a single program or an aggregate of programs. The process executed by the control program 44 will be described later.

The communication interface 45 can communicate with the inside mediation apparatus 13. The communication interface 45 receives commands from the inside mediation apparatus 13 and transmits responses to these commands to the inside mediation apparatus 13.

Next, the processes executed by the first program 24, the second program 34, and the control program 44 will be described.

In general, sequence diagrams in this specification depict steps performed by the CPUs 21, 31, and 41 according to instructions described in programs. In other words, actions such as "determine," "extract," "select," "calculate," "decide," "identify," "specify," "acquire," "receive," "control," "set," and the like in the following description represent steps performed by the CPUs 21, 31, and 41. Processes performed by the CPUs 21, 31, and 41 include processes that control hardware through the corresponding Oses 23, 33, and 43.

In this specification, the term "acquire" is used under a concept that need not necessarily require a request. That is, a process in which the CPU receives data without issuing a request is included in the concept of "the CPU acquires data." Further, "data" in this specification represents bit strings that a computer can read. Further, data of different formats are treated as the same data when the content of the data is essentially the same. The same holds true for "information" in this specification. The processes for "instruction," "command," "response," and "request" are executed by communicating (e.g., transmitting) respective information specifying "instruction," "command," "response," and "request." The terms such as "instruction," "command," "response," "request," and the like may be used also in the sense of information per se which specifies an instruction, command, response, request, and the like.

Further, processes performed by the CPU according to instructions described in a program may be described in abbreviated terms, such as "the CPU 21 executes," "the first program 24 executes," or "the outside mediation apparatus 12." The same holds true for the CPUs 31 and 41. Similarly, the input and output of information performed by a program via a communication interface or user interface may be described in abbreviated terms, such as "the CPU 21 receives," "the first program 24 transmits," or "the outside mediation apparatus 12 acquires." The same holds true for the CPUs 31 and 41.

Further, a process in which the CPU determines whether information A indicates circumstance B may be described conceptually as "determining whether circumstance B on the basis of information A." A process in which the CPU determines whether information A indicates circumstance B or circumstance C may be described conceptually as "determining whether circumstance B or circumstance C on the basis of information A."

The terms "data" and "information" used in this specification share aspects of being bits or bit strings that computers can handle. The computer treats "data" without considering the significance of its individual bits. In the case of "information," on the other hand, the computer's operations branch based on the significance of the individual bits. Additionally, a "command" is a control signal prompting the destination device to perform the next operation. A command may include information and may itself possess the properties of information.

Further, data and information are treated as the same data and information even when the format (such as a text format, binary format, or flag format) is modified for different computers, provided that the computers can recognize the same content. For example, information specifying the number "two" may be stored in one computer as information in the text format for the ASCII code "0x32", and may be stored in a different computer as information in the binary format for the binary notation "10."

However, the distinction between data and information is not strictly enforced; exceptions to the rule may be allowed. For example, data may be temporarily treated as information, while information may be temporarily treated as data. Further, certain bits or bit strings may be treated as data on one device and information on another. Further, information may be extracted from data, and data may be extracted from information.

Further, "execute process A in response to" in this specification indicates that process A is to be executed when the condition specified after the phrase "in response to" has been met. Note that the timing at which process A is executed should be after the condition has been met, but need not be immediately after the condition is met.

Next, processes executed by the first program 24 of the outside mediation apparatus 12, the second program 34 of the inside mediation apparatus 13, and the control program 44 of the printer 14 will be described with reference to FIGS. 3 to 5. Note that the inside mediation apparatus 13 (i.e., the second program 34) periodically transmits an HTTP request to the outside mediation apparatus 12 (i.e., the first program 24). The firewall blocks data transmissions from the outside mediation apparatus 12 to the inside mediation apparatus 13 other than HTTP responses which are responses to the HTTP requests transmitted from the inside mediation apparatus 13.

First, the process of registering the device ID of the printer 14 in the correlation database DB (specifically, the first table TB1) stored in the memory 22 of the outside mediation apparatus 12 and initiating management of the printer 14 on the management system 10 will be described with reference to FIG. 3.

Figure 3:
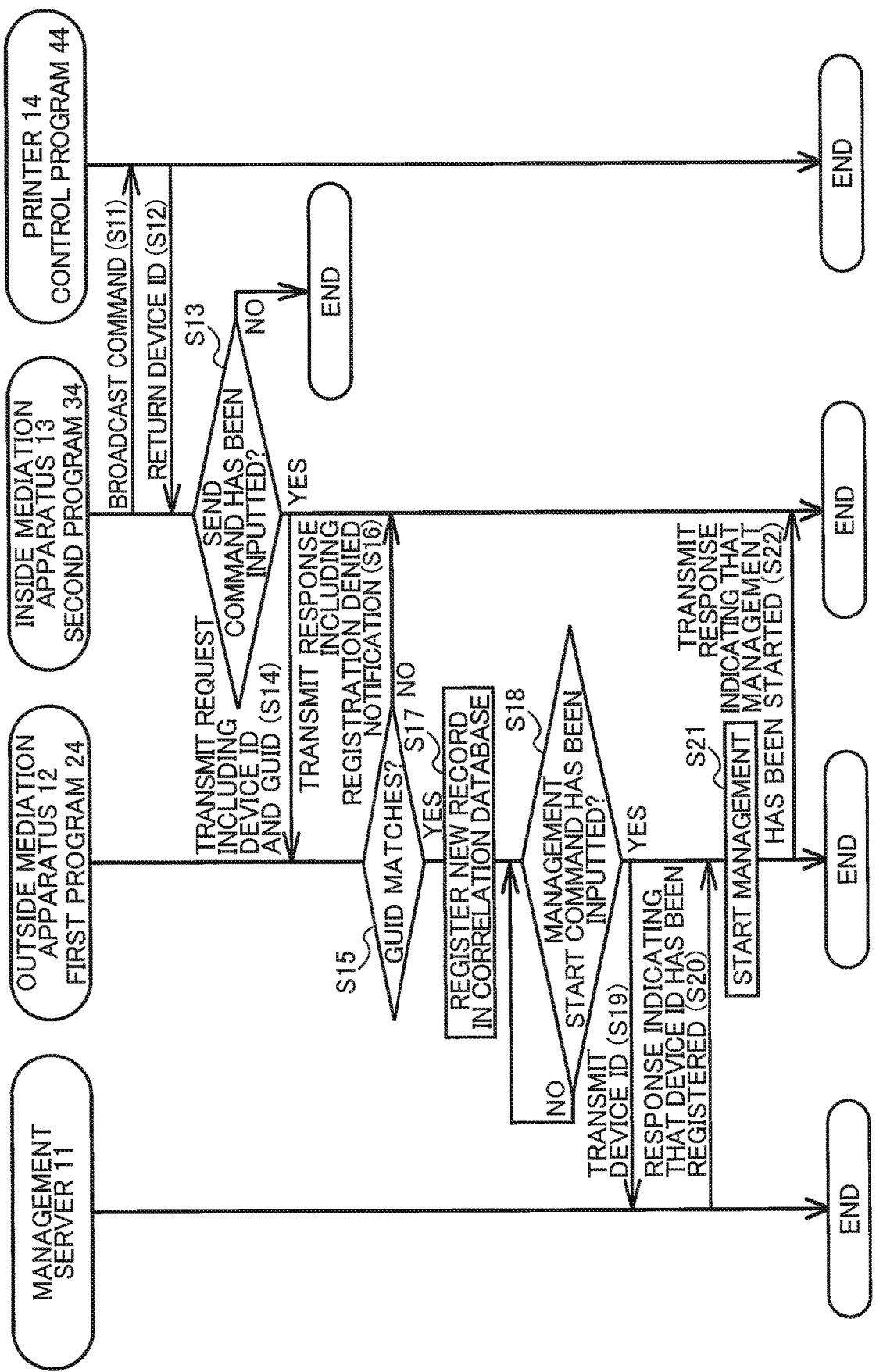
FIG. 3 is a sequence diagram illustrating a process executed by a management server, the outside mediation apparatus, an inside mediation apparatus, and the printer in the management system according to the embodiment, and the process is executed for registering a device ID of the printer and a GUID of the inside mediation apparatus in the management server.

In S11 of FIG. 3, the second program 34 of the inside mediation apparatus 13 broadcasts a command over the local area network 16 requesting printers 14 to return (or transmit) their device IDs. For example, in response to receiving a device search command (described later) from the outside mediation apparatus 12 in S91 of FIG. 6, the second program 34 of the inside mediation apparatus 13 broadcasts the command of S11.

Note that, as will be described in detail later, the outside mediation apparatus 12 includes information, such as a command, in an HTTP response to an HTTP request received from the inside mediation apparatus 13 and transmits the HTTP response to the inside mediation apparatus 13, thereby transmitting the information thereto.

In S11, the printers 14 which are connected to the same local area network 16 over which the second program 34 of the inside mediation apparatus 13 broadcast the command of S11 receives this command. In S12 the control program 44 of each printer 14 that has received the command returns a response that includes the device ID identifying itself.

In S12, the second program 34 of the inside mediation apparatus 13 receives the response from the control program 44 of the printer 14. In S13 the second program 34 determines whether a send command has been inputted.

For example, in response to receiving a response including the device ID of a printer 14, the second program 34 displays this device ID on the display 40 of the inside mediation apparatus 13. An operator of the inside mediation apparatus 13 determines whether the device ID displayed on the display 40 is the device ID of a printer 14 targeted for management. The operator inputs a send command into the inside mediation apparatus 13 when determining that the displayed device ID is the device ID of a printer 14 targeted for management. However, if the operator determines that the displayed device ID is not the device ID of a printer 14 targeted for management, the operator inputs a command to delete the device ID (i.e., a command not to send the device ID). In other words, the operator at each branch office confirms whether each device ID collected through the broadcast is the device ID of a printer 14 to be managed with the management system 10.

If the second program 34 of the inside mediation apparatus 13 determines that a command not to send any of the collected device IDs was inputted (S13: NO), the second program 34 ends this process without transmitting any of the collected device IDs to the outside mediation apparatus 12. However, if a send command was inputted (S13: YES), in S14 the second program 34 transmits to the outside mediation apparatus 12 an HTTP request including the collected device IDs and its own GUID stored in the memory 32. This HTTP request is a request requesting to register the collected device IDs (i.e., the printers 14 identified by the collected device IDs). The HTTP request transmitted in S14 is an example of claimed "device registration request."

Note that, when a plurality of device IDs was collected, each device ID may be transmitted individually to the outside mediation apparatus 12 or all of the collected device IDs may be transmitted together to the outside mediation apparatus 12. Further, the HTTP request transmitted in S14 may be one of the HTTP requests that the inside mediation apparatus 13 periodically transmits to the outside mediation apparatus 12 or may be a separate HTTP request from the periodically transmitted HTTP requests.

In S14 the outside mediation apparatus 12 receives the HTTP request including the device IDs and GUID from the second program 34 of the inside mediation apparatus 13. In S15 the first program 24 of the outside mediation apparatus 12 determines whether the second table TB2 of the correlation database DB has a record whose GUID matches the GUID included in the HTTP request received in S14 (i.e., whether the second table TB2 of the correlation database DB has a record including the GUID included in the HTTP request received in S14). In other words, the first program 24 determines whether the device IDs have been transmitted by an inside mediation apparatus 13 that has already been registered in the correlation database DB.

If the first program 24 determines that the second table TB2 of the correlation database DB (see FIG. 2B) does not have a record whose GUID matches the GUID included in the HTTP request received in S14 (S15: NO), in S16 the first program 24 transmits, as a response to the HTTP request received in S14, an HTTP response including a registration denied notification to the inside mediation apparatus 13. The registration denied notification indicates that registration of the device IDs received in S14 is denied. In other words, when the first program 24 receives an HTTP request including device IDs from an inside mediation apparatus 13 not registered in the correlation database DB, the first program 24 does not register the device IDs in the first table TB1 of the correlation database DB. In this way, the first program 24 prevents device IDs from being registered the first table TB1 of the correlation database DB for inside mediation apparatuses 13 that are not registered in the correlation database DB.

If the first program 24 determines that the first table TB1 of the correlation database DB has a record whose GUID matches the GUID included in the HTTP request received in S14 (S15: YES), in S17 the first program 24 registers, in the correlation database DB, one or more unregistered device IDs of the device IDs included in the HTTP request received in S14.

More specifically, in S17 the first program 24 determines whether the device IDs in the HTTP request received in S14 includes one or more unregistered device IDs, i.e., device IDs that have not yet been registered in the first table TB1 of the correlation database DB (see FIG. 2A). When the device IDs in the received HTTP request includes one or more unregistered device IDs, in S17 the first program 24 adds one or more new records for the one or more unregistered device IDs to the first table TB1 of the correlation database DB, registers the one or more unregistered device IDs in respective ones of the one or more new records, and further registers the GUID included in the received HTTP request in each of the one or more new records.

Although not indicated in the sequence diagram, the first program 24 of the outside mediation apparatus 12 also generates display data representing the correlation database DB and stores this display data in the memory 22. The generated display data includes display data representing the first table TB1 and display data representing the second table TB2. The first program 24 displays this display data on the display 30 when an instruction for displaying the display data is received from the administrator via the user interface 26. Hence, the administrator can display on the display 30 the correlation database DB stored in the memory 22 to confirm its contents (e.g., contents of the first table TB1 and the second tables TB2).

The first program 24 has a URL. For example, the first program 24 transmits the display data stored in the memory 22 to the inside mediation apparatus 13 in response to receiving, from a browser on the inside mediation apparatus 13, a transmission request requesting to transmit the display data. In other words, the operator of the inside mediation apparatus 13 can browse the correlation database DB stored in the memory 22 of the outside mediation apparatus 12 via a web page. The administrator can also view the correlation database DB using a mobile terminal or the like even when away from the outside mediation apparatus 12.

Although not indicated in the sequence diagram, the first program 24 of the outside mediation apparatus 12 also returns an HTTP response to the inside mediation apparatus 13 as a response to the HTTP request received in S14. This HTTP response includes information specifying that the device IDs were received. Alternatively, the first program 24 of the outside mediation apparatus 12 may transmit an HTTP response that includes the device IDs that were newly registered in the correlation database DB to the inside mediation apparatus 13 as a response to the HTTP request received in S14. In this case, in response to receiving the HTTP response that includes the device IDs that were newly registered in the correlation database DB, the second program 34 of the inside mediation apparatus 13 stores the device IDs included in this HTTP response in the memory 32. Further, in response to receiving this HTTP response or in response to a command inputted by the operator, the second program 34 displays the device IDs stored in the memory 32 on the display 40. Thus, from the device IDs displayed on the display 40, the operator can confirm the device IDs that have been newly registered in the correlation database DB.

When a new record for an unregistered device ID is added to the first table TB1 of the correlation database DB, the initial value "Waiting" is stored under the item "Condition Information" of the new record. In the example of FIG. 2A, the record for a printer 14 having device ID "009" is a newly added registered. Printers 14 identified by the device IDs registered in records whose Condition Information indicates "Waiting" have not yet been registered on the management server 11. These printers 14 are not yet under the management of the management system 10 and can be said to be in a provisional registration state. On the other hand, the item "Condition Information" in records for printers 14 under management has been changed from "Waiting" to "Managing."

Although not indicated in the sequence diagram, if the first program 24 of the outside mediation 12 determines that the received device IDs includes one or more device IDs that have already been registered in the first table TB1 of the correlation database DB, the first program 24 of the outside mediation apparatus 12 transmits a response to the inside mediation apparatus 13 indicating that the one or more device IDs have already been registered.

Further, although not indicated in the sequence diagram, the first program 24 of the outside mediation apparatus 12 determines whether a delete command to delete a record was inputted. For example, the delete command may be a command that the administrator inputs on the outside mediation apparatus 12. For example, when one or more new records are generated and registered in the correlation database DB, the first program 24 displays information on the display 30 indicating that one or more new records were generated and registered in the correlation database DB, for example. When seeing this display 30, the administrator may instruct the outside mediation apparatus 12 to display the first table TB1 of the correlation database DB on the display 30, and determine whether one or more printers 14 identified by the device IDs in records whose item "Condition Information" indicates "Waiting" are printers 14 to be targeted for management. The administrator inputs a delete command for one or more device IDs of one or more printers 14 that the administrator determined not to be managed with the management system 10. In this way, the operator of each inside mediation apparatus 13 confirms whether each device ID should be registered in the correlation database DB, and subsequently the administrator of the outside mediation apparatus 12 confirms whether each device ID should be registered in the correlation database DB.

Note that step S13 performed by the second program 34 may be omitted, and only the administrator of the outside mediation apparatus 12 may confirm whether device IDs should be registered in the correlation database DB. In other words, the second program 34 may transmit the device IDs received from printers 14 to the outside mediation apparatus 12 without receiving confirmation from the operator of the inside mediation apparatus 13.

If the first program 24 of the outside mediation apparatus 12 determines that a delete command was inputted, the first program 24 deletes the records designated by the delete command from the correlation database DB.

In S18 the first program 24 determines whether a management start command for initiating management on the management system 10 has been inputted. When determining that a management start command has not been yet inputted (S18: NO), the first program 24 repeats the determination of S18. In other words, the first program 24 waits until a management start command is inputted (S18: NO).

On the other hand, when the first program 24 determines that a management start command was inputted (S18: YES), in S19 the first program 24 transmits a command to the management server 11. This command includes, as accompanying information, the device IDs that have been newly registered in the correlation database DB in S17. This command also requests the management server 11 to register the accompanying device IDs as device IDs for printers 14 under management.

Note that, in S18, the first program 24 of the outside mediation apparatus 12 may receive an input of a command declining to initiate management. In this case, in S22 the first program 24 transmits an HTTP response to the second program 34 specifying that the command for declining to initiate management is inputted. In response to receiving this HTTP response, the second program 34 displays information on the display 40 specifying that the command declining to initiate management was inputted on the outside mediation apparatus 12. Based on this information displayed on the display 40, the operator of the inside mediation apparatus 13 can confirm that the command for declining to start management was inputted on the outside mediation apparatus 12.

In S19 the management server 11 receives the command transmitted in S19 from the outside mediation apparatus 12. In response to receiving the command, the management server 11 stores the device IDs included in this command in a memory (not shown). In other words, the management server 11 registers the device IDs included in the command as device IDs for printers 14 under management. Then, in S20 the management server 11 transmits a response to the outside mediation apparatus 12 via the Internet 15. This response indicates that the device IDs included in the command have been registered on the management server 11.

In S20 the outside mediation apparatus 12 receives the response from the management server 11. In response to receiving this response from the management server 11, in S21 the first program 24 of the outside mediation apparatus 12 starts management on the management system 10. More specifically, in the first table TB1 of the correlation database DB shown in FIG. 2A, the first program 24 changes the "Condition Information" from "Waiting" to "Managing" in each of the records whose device ID was included in the command transmitted in S19.

In S22, as a response to one of HTTP requests periodically received from the inside mediation apparatus 13, the first program 24 transmits to the inside mediation apparatus 13 an HTTP response including the device IDs in the records whose Condition Information has been changed from "Waiting" to "Managing" in S21, i.e., the device IDs for the printers 14 for which management was initiated in S21. At this time, the first program 24 does not transmit the device IDs that were deleted in S17.

Note that the first program 24 of the outside mediation apparatus 12 may transmit the HTTP response of S22 to the inside mediation apparatus 13 as a response to the HTTP request received in S14. Further, after the first program 24 determines that a management start command has been inputted (S18: YES), the management server 11 and the first program 24 may perform the following alternative process to the process of S19 and S20. In the alternative process, in response to determining that a management start command has been inputted (S18: YES), the first program 24 transmits an HTTP request to the management server 11 that includes a notification indicating that there are new printers 14 to be managed with the management system 10. Upon receiving this HTTP request from the first program 24, the management server 11 transmits an HTTP response to the first program 24 that includes a receipt acknowledgement indicating that the management server 11 has received the notification. The management server 11 then transmits an HTTP request to the first program 24 that includes a request requesting to transmit the device IDs of the new printers 14. In response to receiving this HTTP request, the first program 24 transmits an HTTP response to the management server 11 that includes the device IDs of the new printers 14.

Although not indicated in the sequence diagram, in response to receiving the device IDs of the printers 14 for which management has been initiated in S21, the second program 34 of the inside mediation apparatus 13 stores the device IDs in the memory 32. For example, after receiving the device IDs in S22, the second program 34 displays on the display 40 information indicating that the device IDs of the printer 14 for which management was initiated has been received, thereby notifying the operator of such information.

Further, the operator can instruct the inside mediation apparatus 13 to display the device IDs stored in the memory 32 on the display 40 and confirm the printers 14 for which management has been begun. Note that the administrator of the outside mediation apparatus 12 can also confirm the printers 14 for which management has begun by instructing the outside mediation apparatus 12 to display on the display 30 the first table TB1 of the correlation database DB stored in the memory 22. Additionally, in order to confirm the printers 14 for which management has begun, the operator of the inside mediation apparatus 13 and the administrator of the outside mediation apparatus 12 can use a browser to display the data stored on the management server 11 on the displays 40 and 30, respectively.

Next, the process illustrated in FIGS. 4 and 5 will be described in detail. In the process in FIGS. 4 and 5, commands according to instructions from the management server 11 are inputted into the printers 14 identified by the device IDs registered in the records whose Condition Information indicates "Managing." In other words, the management server 11 manages the printers 14. Note that the administrator of the management server 11 uses a browser to input instructions into the management server 11.

Figure 4:
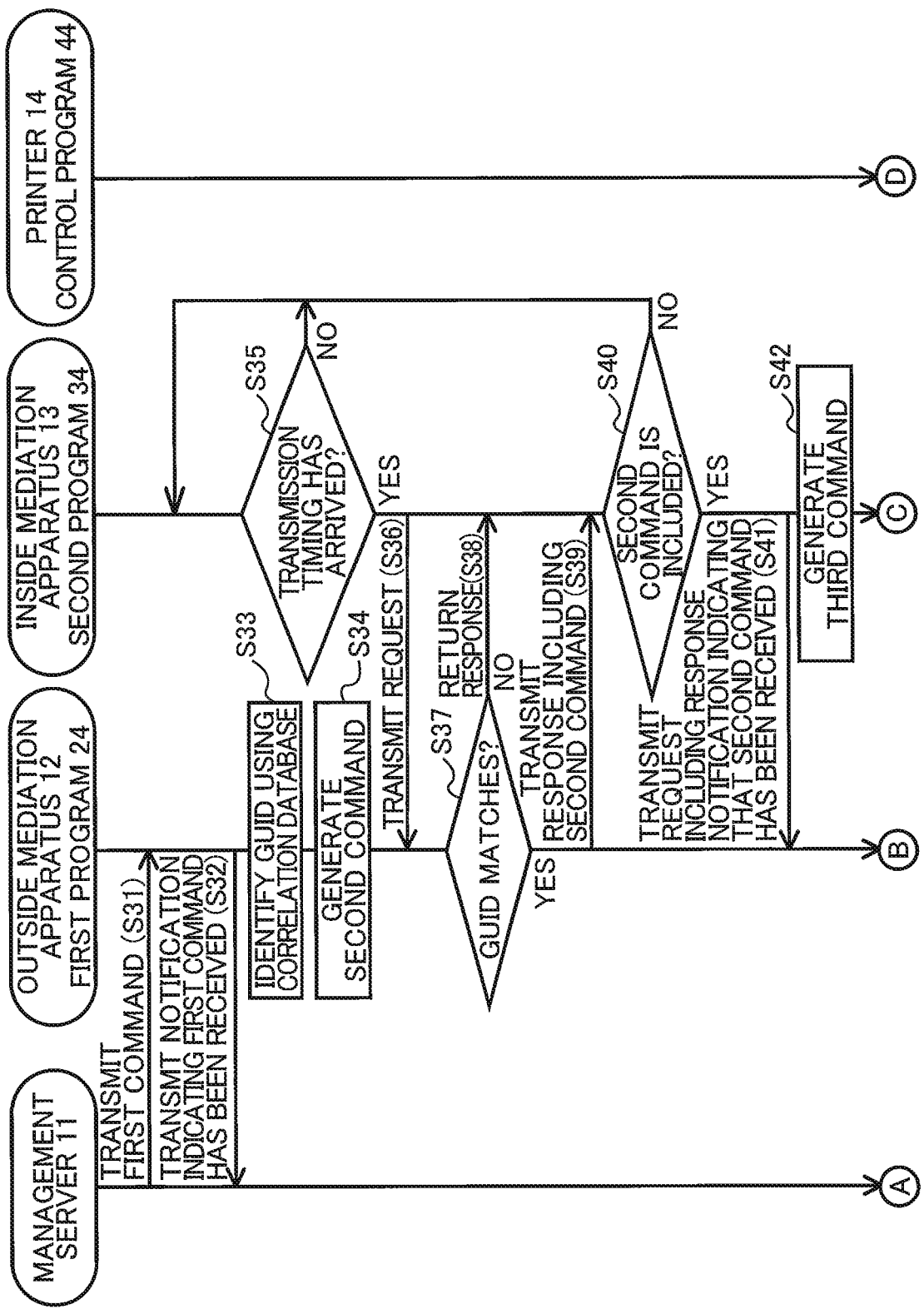
FIG. 4 is a sequence diagram illustrating a first part of a process executed by the management server, the outside mediation apparatus, the inside mediation apparatus, and the printer in the management system according to the embodiment, and the process is executed for instructing the printer to execute an instruction from the management server.

In S31 of FIG. 4, the management server 11 first transmits a first command to the outside mediation apparatus 12 though the Internet 15. The first command is a command causing the outside mediation apparatus 12 to execute an instruction corresponding to an instruction which the printer 14 is made to execute. In other words, the first command includes an instruction for the printer 14 (i.e., an instruction which the printer is to made to execute). The first command includes, as accompanying information, a device ID for identifying the printer 14 that is to be made to execute the instruction. The instruction for the printer 14 included in the first command is an example of the claimed base instruction. The first command is an example of the claimed "instruction information." The device ID included in the first command is an example of the claimed "identification information."

The first command is, for example, a command causing the outside mediation apparatus 12 to execute an instruction corresponding to: an instruction instructing to modify settings of the printer 14 (such as the items "Font," "Font Size," "Density," and the like under the item "Settings Information") (see FIG. 2A); an instruction instructing to update the firmware version of the control program 44 installed on the printer 14 (see FIG. 2A); or an instruction instructing to return the current settings status information of the printer 14. The settings status information indicates status of settings in the printer 14. For example, the settings status information includes setting values, i.e., values corresponding to the items under the item "Settings Information" in the correlation database. Note that the instruction for the printer 14 specified by the first command is not limited to that described above.

In S31 the first program 24 of the outside mediation apparatus 12 receives the first command from the management server 11. In response to receiving the first command, in S32 the first program 24 of the outside mediation apparatus 12 transmits a notification to the management server 11 indicating that the first command was received.

After receiving the first command, in S33 the first program 24 of the outside mediation apparatus 12 identifies the GUID associated with the device ID included in the received first command by referencing the first table TB1 of the correlation database DB. In other words, the first program 24 uses the GUID to identify the inside mediation apparatus 13 on the local area network 16 to which the printer 14 to be made to execute an instruction based on the received first command belongs. More specifically, the first program 24 identifies, from the first table TB1 of the correlation database DB, the record whose device ID matches the device ID included in the received first command. Then, the first program 24 identifies the GUID registered in the item "GUID" of the identified record as the GUID corresponding to the device ID included in the received first command.

In S34 the first program 24 generates a second command according to the instruction specified by the first command. The second command is a command that can be inputted into (or interpreted by) the inside mediation apparatus 13. The second command is a command generated on the basis of the content of the instruction specified by the first command. In other words, the second command is generated independently of requests (such as, the HTTP requests) that the inside mediation apparatus 13 transmits. The second command includes an instruction for the printer 14 corresponding to the instruction for the printer 14 included in the first command. The second command further includes, as accompanying information, the device ID included in the first command. The second command is an example of the claimed "specific command." The instruction for the printer 14 included in the second command is an example of the claimed "specific instruction."

While not shown in FIG. 1, the data storage area 29 in the memory 22 of the outside mediation apparatus 12 stores a first command list. The first command list specifies correlations between first commands and second commands. In S34 the first program 24 of the outside mediation apparatus 12 generates the second command by: extracting, from the first command list, the second command that is associated with the first command received in S31; and including in the extracted second command the device ID included in the received first command to the second command as accompanying information.

While not shown in the sequence diagram, if the instruction specified by the first command includes an instruction instructing to transmit a file to the printer 14, the first program 24 of the outside mediation apparatus 12 requests the management server 11 to transmit the file. In response to receiving this request, the management server 11 transmits the file to the outside mediation apparatus 12. The first program 24 receives the file and stores the same in the memory 22. Some examples of files to be transmitted to the printer 14 are a file containing text instructing to modify settings on the printer 14, and a program file for a new version of the control program 44. In a case where the first program 24 receives the file from the management server 11, in S34 the first program 24 generates a second command including an instruction instructing the second program 34 of the inside mediation apparatus 13 to download the file.

After generating the second command, the first program 24 waits until an HTTP request has been received from the inside mediation apparatus 13.

In the meantime, in S35 the second program 34 of the inside mediation apparatus 13 determines whether a transmission timing has arrived and repeatedly performs this determination while the transmission timing has not arrived (S35: NO). Here, the transmission timing is indicated by data stored in the memory 32. The transmission timing is set to an interval of a few seconds to a few tens of seconds, such as a 10-second, 15-second, or 20-second interval.

If the second program 34 of the inside mediation apparatus 13 determines that the transmission timing has arrived (S35: YES), in S36 the second program 34 transmits an HTTP request including its own GUID to the outside mediation apparatus 12. The HTTP request transmitted in S36 is an example of the claimed "instruction request."

Note that the outside mediation apparatus 12 can transmit the second command to the inside mediation apparatus 13 through the firewall by including the second command in an HTTP response to an HTTP request transmitted from the inside mediation apparatus 13. As described above, the firewall blocks transmissions from the outside mediation apparatus 12 to the inside mediation apparatus 13 other than HTTP responses to HTTP requests transmitted from the inside mediation apparatus 13. For this reason, the inside mediation apparatus 13 transmits an HTTP request to the outside mediation apparatus 12 periodically.

In S36 the first program 24 of the outside mediation apparatus 12 receives an HTTP request transmitted from the inside mediation apparatus 13. In S37 the first program 24 determines whether the GUID included in the HTTP request received in S36 matches the GUID identified in S33. In other words, the first program 24 determines whether the inside mediation apparatus 13 that transmitted the HTTP request is the inside mediation apparatus 13 to which the second command generated in S34 is to be transmitted.

If the first program 24 determines that the GUID included in the HTTP request received in S36 does not match the GUID identified in S33 (S37: NO), in S38 the first program 24 transmits, to the second program 34, an HTTP response that does not include the second command. This HTTP response transmitted in S38 specifies that the HTTP request transmitted in S36 was received.

However, if the first program 24 determines that the GUID included in the HTTP request received in S36 matches the GUID identified in S33 (S37: YES), in S39 the first program 24 transmits to the second program 34 an HTTP response that includes the second command.

In S38 or S39 the second program 34 of the inside mediation apparatus 13 receives the HTTP response transmitted from the outside mediation apparatus 12. In S40 the second program 34 determines whether the received HTTP response includes a second command. If the second program 34 determines that the HTTP response does not include a second command (S40: NO), the second program 34 continues to transmit periodic HTTP requests.

However, if the second program 34 determines that the HTTP response includes a second command (S40: YES), in S41 the second program 34 transmits an HTTP request to the outside mediation apparatus 12 that includes a response notification specifying that the second command was received (hereinafter called a "reception notification"). In other words, the second program 34 notifies the outside mediation apparatus 12 that the second command was received by the second program 34. The reception notification or the HTTP request including the reception notification is an example of the claimed "specific response."

As described above, the first program 24 of the outside mediation apparatus 12 returns the second command as an HTTP response to an HTTP request received from the inside mediation apparatus 13. Therefore, if the outside mediation apparatus 12 does not receive a reception notification from the inside mediation apparatus 13, the first program 24 of the outside mediation apparatus 12 cannot determine whether the inside mediation apparatus 13 was able to receive the second command until the first program 24 receives a response corresponding to the second command (i.e., a response transmitted in S57). In such a case, the time required for the outside mediation apparatus 12 to receive a response corresponding to the second command would exceed the prescribed time which is set as the time interval to wait until re-sending the second command, resulting in the outside mediation apparatus 12 re-sending the second command even if the inside mediation apparatus 13 has already received the second command.

In the embodiment, the second program 34 of the inside mediation apparatus 13 transmits the reception notification to the outside mediation apparatus 12 prior to transmitting the response corresponding to the second command (the response transmitted in S57). This action prevents the outside mediation apparatus 12 from re-sending the second command despite the inside mediation apparatus 13 having already received the second command.

In S41 the first program 24 of the outside mediation apparatus 12 receives the HTTP request that includes the reception notification. In response to receiving the HTTP request including the reception notification, the first program 24 returns an HTTP response to the inside mediation apparatus 13 indicating that the reception notification was received. While not shown in the sequence diagram, if the first program 24 determines that an HTTP request including a reception notification has not been received within the prescribed time, the first program 24 re-sends the second command to the inside mediation apparatus 13 as an HTTP response to an HTTP request transmitted periodically from the inside mediation apparatus 13.

After completing the process of S41, in S42 the second program 34 of the inside mediation apparatus 13 generates a third command to be transmitted to the printer 14. The third command is a command that can be inputted into (or interpreted by) the printer 14 and includes an instruction for the printer 14 corresponding to the instruction for the printer 14 included in the second command. In other words, the third command includes an instruction for the printer 14 corresponding to the instruction for the printer 14 included in the first command.

While not shown in FIG. 1, the data storage area 39 in the memory 32 of the inside mediation apparatus 13 stores a second command list specifying correlations between second commands and third commands. In S42 the second program 34 of the inside mediation apparatus 13 generates the third command by referencing the second command list and extracting from the second command list the third command associated with the second command received in S39.

While not shown in the sequence diagram of FIG. 4, when the second command received in S39 indicates download of a file, the second program 34 of the inside mediation apparatus 13 transmits an HTTP request that includes a file transmission request to the outside mediation apparatus 12. In response to receiving this HTTP request, the first program 24 of the outside mediation apparatus 12 transmits an HTTP response including the file to the inside mediation apparatus 13 in accordance with the transmission request included in the HTTP request. The second program 34 of the inside mediation apparatus 13 receives the file included in this HTTP response and generates a third command that includes the settings or programs in the received file. The file may be included in the second command, and the second command having the file may be transmitted from the first program 24 to the second program 34. In this case, the second program 34 need not transmit a file transmission request to the first program 24.

The second program 34 of the inside mediation apparatus 13 may determine based on a settings information request flag attached to the second command whether the instruction specified by the second command received in S39 is an instruction to acquire settings status information or other instructions such as an instruction to modify settings and an instruction to update the firmware version. For example, if the first command received in S31 has an instruction for requesting settings status information, the first program 24 of the outside mediation apparatus 12 attaches a settings information request flag set to "ON" to the second command.

Figure 5:
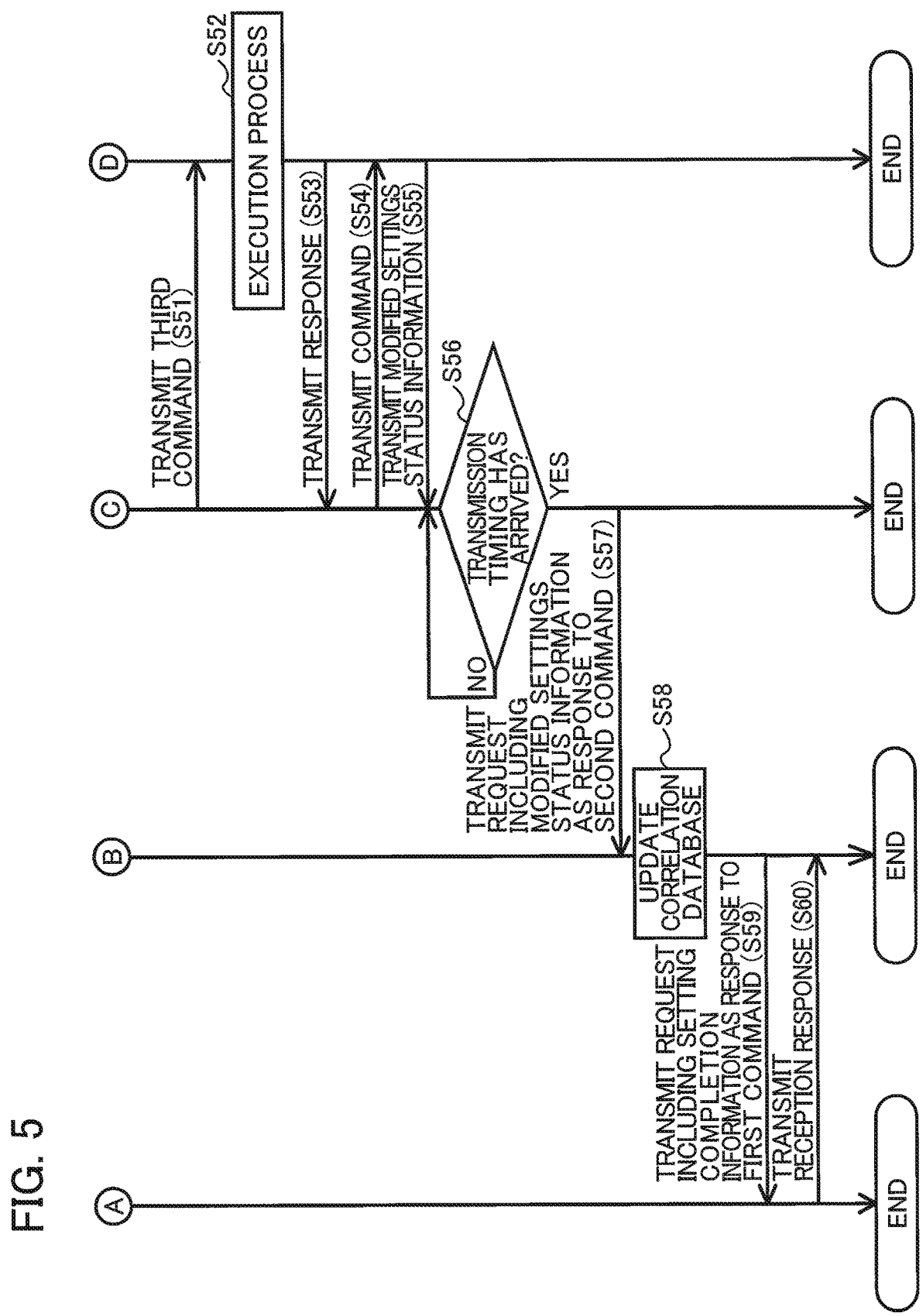
FIG. 5 is a sequence diagram illustrating a second part of the process executed by the management server, the outside mediation apparatus, the inside mediation apparatus, and the printer in the management system according to the embodiment.

As illustrated in FIG. 5, after the second program 34 of the inside mediation apparatus 13 has generated the third command, in S51 the second program 34 transmits the third command to the printer 14 identified by the device ID included in the second command.

In S51 the printer 14 receives the third command from the inside mediation apparatus 13. In S52 the control program 44 of the printer 14 executes the instruction specified by the third command.

For example, if the third command specifies an instruction to modify settings of the printer 14 corresponding to "Font," "Font Size," "Density," and other items under the item "Settings Information" (see FIG. 2A), the control program 44 modifies the setting value for each of "Font," "Font Size," "Density," and other items to a setting value included in the third command. If the third command specifies an instruction to update the firmware version, the control program 44 updates itself using the program included in the third command. If the third command specifies an instruction requesting that the settings status information be returned, in S53 the control program 44 returns the current settings status information of the printer 14 as a response to the third command.

In S53 the control program 44 of the printer 14 transmits a response to the inside mediation apparatus 13 indicating that the instruction specified by the third instruction command was executed.

In S53 the second program 34 of the inside mediation apparatus 13 receives the response from the printer 14. In response to receiving this response from the printer 14, in S54 the second program 34 transmits a command to the printer 14 requesting to return the settings status information. The settings status information includes setting values, the firmware version of the control program 44, and the like. Note that the second program 34 skips steps S54 and S55 when the third instruction command transmitted in S51 specifies an instruction requesting the printer 14 to return the settings status information.

Upon receiving in S54 the command requesting to return the settings status information, in S55 the control program 44 of the printer 14 returns the settings status information. In S55 the inside mediation apparatus 13 receives the settings status information from the printer 14. The settings status information transmitted in S55 by the printer 14 is the settings status information after the control program 44 of the printer 14 has executed the instruction specified by the third instruction command in S52.

After receiving the settings status information, in S56 the second program 34 of the inside mediation apparatus 13 waits until the transmission timing for periodically transmitting HTTP requests has arrived (S56: NO). When the second program 34 determines that the transmission timing has arrived (S56: YES), in S57 the second program 34 transmits an HTTP request to the outside mediation apparatus 12 as a response to the second command received in S39. This HTTP request includes the received settings status information, i.e., the settings status information for the printer 14 after the modification in S52. Note that, after receiving the settings status information in S55, the second program 34 need not necessarily wait for arrival of the transmission timing in S56 and may immediately transmit the HTTP request including the received settings status information to the outside mediation apparatus 12.

Including the settings status information in one of the HTTP requests transmitted periodically to the outside mediation apparatus 12 can reduce the number of communications between the inside mediation apparatus 13 and outside mediation apparatus 12 compared to when the settings status information is transmitted in a separate HTTP request from the periodically transmitted HTTP requests. However, the second program 34 may include the modified settings status information in a separate HTTP request from the periodically transmitted HTTP requests and transmit this separate HTTP request to the outside mediation apparatus 12. In this case, the settings status information can be sent more quickly to the outside mediation apparatus 12 than when the settings status information is included in one of the periodically transmitted HTTP requests.

In S57 the first program 24 of the outside mediation apparatus 12 receives the modified settings status information as a response to the second command. After receiving the settings status information, in S58 the first program 24 overwrites the values for settings, the firmware version, and the like in the first table TB1 of the correlation database DB (see FIG. 2A) with the received settings status information.

While not shown in the sequence diagram, after the first program 24 receives the HTTP request including settings status information in S57, the first program 24 transmits, as an HTTP response to this request, a notification to the inside mediation apparatus 13 indicating that the HTTP request was received.

In S59 the first program 24 of the outside mediation apparatus 12 generates setting completion information that includes: the settings status information received in S57; and information indicating that the printer 14 executed the instruction specified by the first command. Then, the first program 24 transmits a request including the generated setting completion information to the management server 11 as a response to the first command received in S31. The setting completion information is a command that can be inputted into the management server 11 and includes the settings status information as accompanying information, for example. The setting completion information is an example of the claimed "specific information."

Note that, the first program 24 of the outside mediation apparatus 12 may also transmit the settings status information received in S57 to the management server 11 separately from the setting completion information. In other words, information indicating that the settings were performed and settings status information obtained after the settings were performed may be transmitted separately to the management server 11.

After receiving the request including the setting completion information via the Internet 15 in S59, in S60 the management server 11 transmits a reception response to the outside mediation apparatus 12 indicating that the setting completion information was received. The first program 24 of the outside mediation apparatus 12 receives the reception response from the management server 11 in S60, which completes the process. Note that, after the first program 24 performs step S58, the management server 11 and the first program 24 may perform the following alternative process to the process of S59 and S60. In the alternative process, after performing step S58, the first program 24 transmits an HTTP request to the management server 11 that includes a notification indicating that the settings of the printer 14 have been modified in accordance with the instructions for the printer 14 that are included in the first command transmitted in S31 by the management server 11. Upon receiving this HTTP request from the first program 24, the management server 11 transmits an HTTP response to the first program 24 that includes a receipt acknowledgement indicating that the management server 11 has received the notification. The management server 11 then transmits an HTTP request to the first program 24 that includes a request requesting to transmit the settings status information indicating the modified setting values for the printer 14 (i.e., the setting values after the settings of the printer 14 have been modified). In response to receiving this HTTP request, the first program 24 transmits an HTTP response to the management server 11 that includes the settings status information indicating the modified setting values for the printer 14.

Next, a process executed by the first program 24 when the second program 34 that performs the above-described process is installed on an inside mediation apparatus 13 will be described with reference to FIGS. 6 and 2B. Specifically, in the process described below, the first program 24 performs: a process of facilitating communication settings for which a second program 34 installed on the inside mediation apparatus 13 transmits HTTP requests to the outside mediation apparatus 12; and a process of registering a GUID assigned to the inside mediation apparatus 13, location information for a local area network 16 to which the inside mediation apparatus 13 is connected, and other information in the second table TB2 of the correlation database DB. Here, the inside mediation apparatus 13 is an information-processing apparatus that functions as the inside mediation apparatus 13 after the second program 34 is installed (S84). However, in the following description, the inside mediation apparatus 13 will be referred to as not "information-processing apparatus" as but "inside mediation apparatus 13" even before the second program 34 is installed.

The data storage area 29 in the memory 22 of the outside mediation apparatus 12 stores installer download screen data. The installer download screen data represents an installer download screen for receiving a request (or an instruction) to download an installer for installing the second program 34. The operator of the inside mediation apparatus 13 operates the user interface 36 to launch a browser. The browser receives the installer download screen data from the first program 24 (i.e., the outside mediation apparatus 12) and displays the installer download screen represented by the received installer download screen data on the display 40 of the inside mediation apparatus 13.

Then, in conformance with the content displayed in the installer download screen, the operator inputs an authentication ID (such as a guest ID) and a download instruction in the installer download screen. The download instruction is a user instruction instructing the inside mediation apparatus 13 to download an installer for the second program 34.

Figure 6:
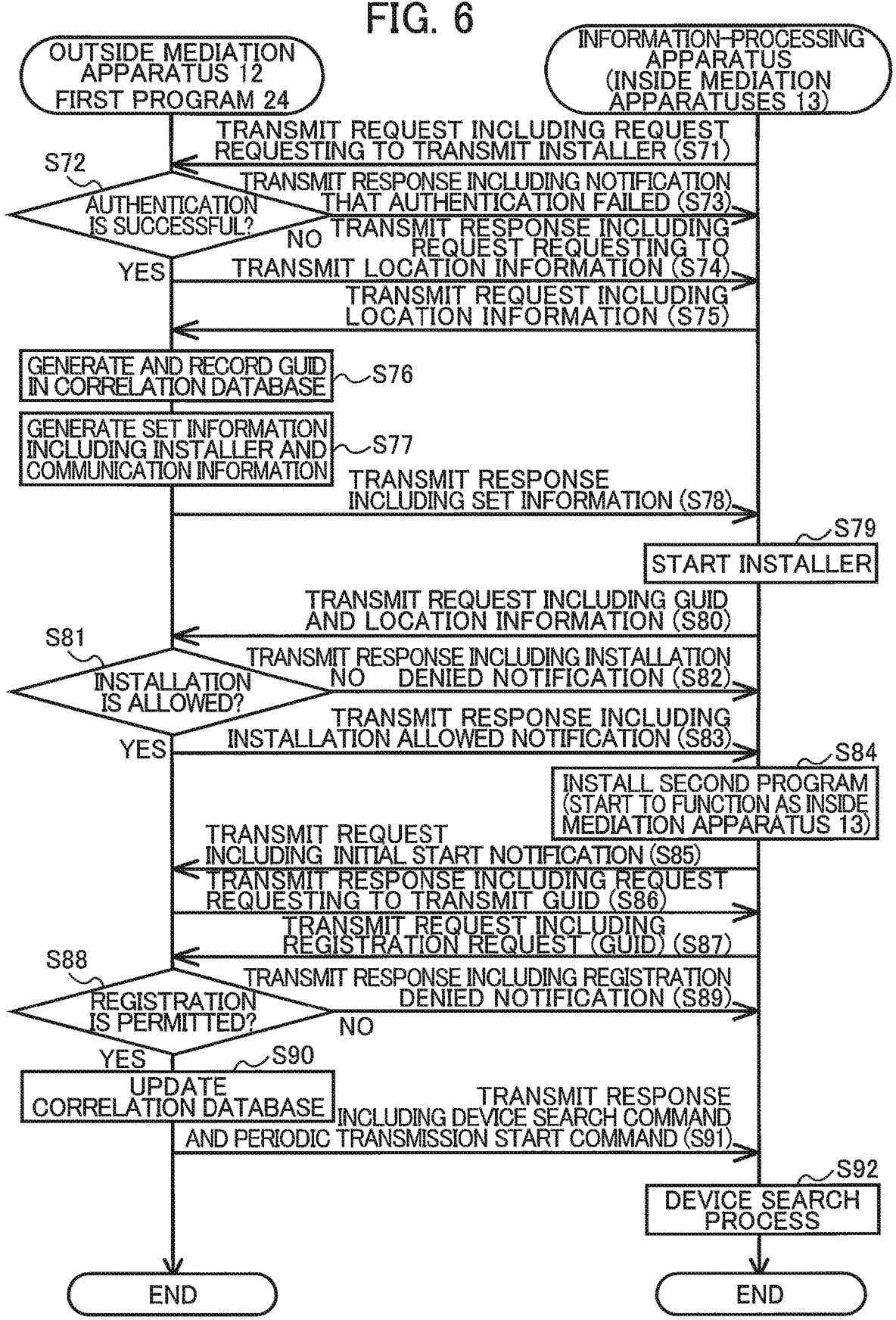
FIG. 6 is a sequence diagram illustrating a process executed by the outside mediation apparatus and the inside mediation apparatus in the management system according to the embodiment, and the process is executed for downloading an installer and a second program to the inside mediation apparatus and installing the second program on the inside mediation apparatus using the installer.

In response to receiving the download instruction from the operator through the installer download screen, in S71 of FIG. 6 the inside mediation apparatus 13 transmits to the outside mediation apparatus 12 an HTTP request including the authentication ID inputted in the installer download screen and an installer transmission request. The installer transmission request is a request requesting the outside mediation apparatus 12 to transmit the installer to the inside mediation apparatus 13. The installer transmission request is an example of the claimed "installer request."

In S71 the first program 24 of the outside mediation apparatus 12 receives, from the inside mediation apparatus 13, the HTTP request including the authentication ID and the installer transmission request.

In S72 the first program 24 determines whether authentication is successful. Specifically, the first program 24 determines whether the authentication ID included in the HTTP request received in S71 matches an authentication ID stored in the data storage area 29 of the memory 22.

If the first program 24 determines that authentication is not successful because the authentication ID in the HTTP request does not match an authentication ID stored in the memory 22 (S72: NO), in S73 the first program 24 transmits to the inside mediation apparatus 13 an HTTP response that includes a notification that authentication failed. However, if the first program 24 determines that authentication was successful because the authentication ID in the HTTP request matches an authentication ID stored in the memory 22 (S72: YES), in S74 the first program 24 transmits to the inside mediation apparatus 13 an HTTP response that includes a request requesting to transmit location information.

Although not indicated in the sequence diagram, after the inside mediation apparatus 13 receives the HTTP response including a request requesting to transmit location information in S74, the browser on the inside mediation apparatus 13 displays, on the display 40, a screen for receiving input for location information. This screen is represented by image data included in the HTTP response received in S74. The operator of the inside mediation apparatus 13 inputs location information into this screen. In S75 the browser transmits an HTTP request including the inputted location information to the outside mediation apparatus 12.

In response to receiving the HTTP request including the location information in S75, in S76 the first program 24 of the outside mediation apparatus 12 generates a GUID and registers (or creates), in the second table TB2 of the correlation database DB, a record that includes the generated GUID and the location information included in the HTTP request received in S75. The GUID is an example of the claimed "apparatus ID."

FIG. 2B depicts the second table TB2 of the correlation database DB. The second table TB2 of the correlation database DB depicted in FIG. 2B has a plurality of records, each of which is a correction of fields. The plurality of fields correspond to respective ones of a plurality of items including the items "GUID," "Location Information," "Communication Start Information," "Installer Download Date," and "Installation Date." Hereinafter, each of the plurality of fields will be sometimes referred to by the name of the corresponding item.

The GUID that the first program 24 generated in S76 is registered under the item "GUID." The location information included in the HTTP received in S75 is registered under the item "Location Information." One of the values "Pending" or "Ready" is registered under the item "Communication Start Information." The first program 24 registers the value "Pending" under the item "Communication Start Information" when creating (or adding) a record in S76. The first program 24 registers the value "Ready" in step S90 described later.

The item "Installer Download Date" indicates the date on which the installer is transmitted in S78 to the inside mediation apparatus 13. The item "Installation Date" indicates the date on which an installation allowed notification for installing the second program 34 is transmitted in S83 to the inside mediation apparatus 13. Note that the plurality of items may include "Installer Download Date and Time" and "Installation Date and Time", instead of "Installer Download Date" and "Installation Date," respectively. In this case, the item "Installer Download Date and Time" indicates the date and time at which the installer is transmitted in S78 to the inside mediation apparatus 13, and the item "Installation Date and Time" indicates the date and time at which an installation allowed notification for installing the second program 34 is transmitted in S83 to the inside mediation apparatus 13.

After completing step S76, in S77 the first program 24 generates set information that includes program files of the installer and the second program 34, location information, and communication information.

The communication information includes: communication settings for the second program 34; and at least one of the URL of the first program 24 and the global IP address of the outside mediation apparatus 12. For example, the communication settings are information indicating designations of: a communication port; a communication protocol such as HTTP or HTTPS; a retry limit indicating the maximum number of attempts allowed to establish communications when those attempts fail; a retry interval specifying the length of time to wait between attempts to establish communications; and a timeout length specifying the maximum time that communications can continue after having been established. These communication settings are pre-stored in the data storage area 29 of the memory 22, for example. Each of the URL and the global IP is an example of the claimed "address."

As an example, in S78 the first program 24 acquires at least one of the URL of the first program 24 and the global IP address of the outside mediation apparatus 12 from the OS 23; reads, from the memory 22, program files of the second program 34 and installer, location information, communication settings, and the GUID generated in S76; includes, in set information, the at least one of the acquired URL and global IP address, the program files, the location information, the communication settings, and the generated GUID; and transmits an HTTP response including this set information to the inside mediation apparatus 13. The inside mediation apparatus 13 is an example of the claimed "request source apparatus." The program file for the installer is an example of the claimed "installer information."

Although not indicated in the sequence diagram, the first program 24 records the date on which step S78 is executed under the item "Installer Download Date." The administrator can confirm the date on which the installer was downloaded and the branch office that downloaded the installer by viewing the second table TB2 of the correlation database DB displayed on the display 30. The date recorded under the item "Installer Download Date" is an example of the claimed "transmission completion information."

Although not indicated in the sequence diagram, when in S78 the browser of the inside mediation apparatus 13 receives the HTTP response including the set information, the browser stores the received set information in the memory 32 of the inside mediation apparatus 13. In S79 the installer included in the set information stored in the memory 32 is started. Note that the installer is started by the operator of the inside mediation apparatus 13 inputting a command into the inside mediation apparatus 13 using the user interface 36. Once started, in S80 the installer transmits an HTTP request to the outside mediation apparatus 12 that includes the GUID and location information included in the set information. This HTTP request is a request requesting the first program 24 (i.e., the outside mediation apparatus 12) to permit installation of the second program 34 on the inside mediation apparatus 13. The HTTP request transmitted in S80 is an example of the claimed "installation permission request."

Upon receiving this HTTP request including the GUID and location information in S80, in S81 the first program 24 of the outside mediation apparatus 12 determines whether a record that includes a GUID and location information matching the GUID and location information included in the HTTP request received in S80 exists in the second table TB2 of the correlation database DB (see FIG. 2B). In other words, in S81 the first program 24 determines whether to allow installation of the second program 34.

If the first program 24 determines that the second table TB of the correlation database DB has no record including the same GUID and location information as those included in the HTTP request (S81: NO), in S82 the first program 24 transmits an HTTP response that includes an installation denied notification to the inside mediation apparatus 13 via the firewall. The installation denied notification indicates that installation of the second program 34 is not allowed.

As will be described later, the installer on the inside mediation apparatus 13 installs, in response to receiving an installation allowed notification (described later), the second program 34 on the inside mediation apparatus 13. That is, the second program 34 is not installed on the inside mediation apparatus 13 when an installation denied notification is received. In this way, by the first program 24 transmitting this installation denied notification, installation of the second program 34 on the inside mediation apparatus 13 with any combination other than the combination of the GUID generated in S76 and location information registered in the correlation database DB is prevented.

On the other hand, if the first program 24 determines that a record including the same GUID and location information as the GUID and location information included in the HTTP request exists in the second table TB2 of the correlation database DB (S81: YES), in S83 the first program 24 transmits an HTTP response that includes an installation allowed notification to the inside mediation apparatus 13 via the firewall. The installation allowed notification indicates that installation of the second program 34 is permitted.

While not shown in the sequence diagram, in response to transmitting an HTTP response including an installation allowed notification to the inside mediation apparatus 13, the first program 24 records, under the item "Installation Date" in the second table TB2 of the correlation database DB, the date on which the installation allowed notification is transmitted. By viewing the second table TB2 of the correlation database DB displayed on the display 30, the administrator can confirm what branch offices have the inside mediation apparatus 13 on which the second program 34 has been installed and what branch offices do not yet have.

In S83 the installer on the inside mediation apparatus 13 receives the HTTP response including an installation allowed notification. In response to receiving the installation allowed notification, the installer installs the second program 34 on the inside mediation apparatus 13 in S84.

As will be described later in detail, after the second program 34 has been installed on the inside mediation apparatus 13, in S85 and S87 the second program 34 requests the first program 24 to register the second program 34 itself in the correlation database DB, and then the first program 24 determines in S88 whether to register the second program 34 installed on the inside mediation apparatus 13 in the correlation database DB (see FIG. 2B). Accordingly, the process from S80 to S83 may be omitted. In this case, after started in S79, the installer installs the second program 34 on the inside mediation apparatus 13 without obtaining permission from the first program 24.

In S85 the second program 34 installed on the inside mediation apparatus 13 transmits to the outside mediation apparatus 12 an HTTP request that includes an initial start notification. The initial start notification indicates that the second program 34 has been installed on the inside mediation apparatus 13.

In response to receiving the HTTP request including an initial start notification in S85, in S86 the first program 24 of the outside mediation apparatus 12 transmits to the inside mediation apparatus 13 an HTTP response that includes a transmission request requesting the second program 34 to transmit its GUID. The HTTP request transmitted in S86 or the transmission request included in this HTTP request is an example of the claimed "an apparatus ID request."

In response to receiving the HTTP response that includes the transmission request requesting to transmit the GUID in S86, in S87 the second program 34 transmits to the outside mediation apparatus 12 an HTTP request that includes: the GUID stored in the memory 32; and a registration request requesting the outside mediation apparatus 12 to register the second program 34 (i.e., the inside mediation apparatus 13) in the correlation database DB. In S87 the first program 24 of the outside mediation apparatus 12 receives the HTTP request including the GUID and registration request. The HTTP request including the registration request and the GUID is an example of the claimed "apparatus registration request."

In S88 the first program 24 determines whether to permit registration of the inside mediation apparatus 13. More specifically, the first program 24 first determines whether the GUID included in the HTTP request received in S87 is present in the second table TB2 of the correlation database DB, i.e., whether the second table TB2 of the correlation database DB has a record including the GUID included in the HTTP request received in S87 (FIG. 2B). That is, the first program 24 determines whether the registration request has been transmitted from the second program 34 that was installed using the GUID generated in S76 on the inside mediation apparatus 13.

If the first program 24 determines that the GUID included in the HTTP request is present in the second table TB2 of the correlation database DB, the first program 24 further determines whether the value stored under the item "Communication Start Information" in the record including this GUID is "Pending" or "Ready." In other words, the first program 24 determines whether the inside mediation apparatus 13 that transmitted the HTTP request is already registered in the correlation database DB.

If the first program 24 determines that the GUID included in the HTTP request is not present in the second table TB2 of the correlation database DB or that the item "Communication Start Information" stores the value "Ready" (S88: NO), the first program 24 determines not to permit registration. Then, in S89 the first program 24 transmits to the inside mediation apparatus 13 an HTTP response including a registration denied notification. With this configuration, multiple installations of second programs 34 on the inside mediation apparatuses 13 using the same GUID are prevented.

On the other hand, if the first program 24 determines that the GUID included in the HTTP request exists in the second table TB2 of the correlation database DB and that the item "Communication Start Information" stores the value "Pending" (S88: YES), in S90 the first program 24 determines to permit registration and changes the value stored under the item "Communication Start Information" in the second table TB2 of the correlation database DB from "Pending" to "Ready." In other words, in S90 the first program 24 registers the value "Ready" in the item "Communication Start Information" of the record including the GUID received in S87. The value "Ready" indicates that registration of the inside mediation apparatus 13 identified by the GUID received in S87 has been permitted. The value "Ready" is an example of the claimed "registration permission information."

As mentioned above, if the process in S80-S83 is omitted and the second program 34 is installed on the inside mediation apparatus 13 without receiving permission from the first program 24, in S87 the second program 34 transmits to the outside mediation apparatus 12 an HTTP request that includes the location information stored in the memory 32, as well as the GUID received in S78 and registration request. If the first program 24 of the outside mediation apparatus 12 determines in S88 that the second table TB2 of the correlation database DB has a record including the GUID and location information included in the HTTP request received in S87 and that the item "Communication Start Information" in the record is "Pending" (S88: YES), in S90 the first program 24 determines to permit registration and modifies the item "Communication Start Information" in the record of the second table TB2 from "Pending" to "Ready."

After completing the process of S90, in S91 the first program 24 transmits to the inside mediation apparatus 13 an HTTP response that includes a device search command and a periodic transmission start command. The device search command is a command instructing the inside mediation apparatus 13 to search for printers 14 that are connected to the local area network 16. The periodic transmission start command is a command instructing the inside mediation apparatus 13 to begin periodic transmission of an HTTP request. The device search command is an example of the claimed "device search instruction."

In response to receiving this HTTP response of S91, in S92 the second program 34 of the inside mediation apparatus 13 executes a device search process. Specifically, the second program 34 broadcasts over the local area network 16 a command requesting to return device IDs. In other words, the second program 34 executes the process described in S11 of FIG. 3 to search for printers 14.

Also in response to receiving the HTTP response of S91, the second program 34 begins, using the communication information included in the set information received in S78, periodic transmission of an HTTP request. Thus, periodic communications between the first program 24 of the outside mediation apparatus 12 and the second program 34 of the inside mediation apparatus 13 begin at this time.

As described above, the firewall blocks data transmissions from the outside mediation apparatus 12 to the inside mediation apparatus 13 other than HTTP responses which are responses to the HTTP requests transmitted from the inside mediation apparatus 13. Therefore, when the Internet-side apparatuses (i.e., the outside mediation apparatus 12 and management server 11 located outside the firewall) generate commands, requests, instructions or the like in relation to HTTP requests that the inside mediation apparatus 13 transmits, the Internet-side apparatuses can transmit them to the intranet-side apparatuses (the inside mediation apparatus 13 and printers 14 located inside the firewall) via the firewall as responses to the HTTP requests. However, when the Internet-side apparatuses generate commands or the like independently of HTTP requests that the inside mediation apparatus 13 transmits, the Internet-side apparatuses cannot transmit them to the intranet-side apparatuses via the firewall.

In view of the foregoing, in the present embodiment, the inside mediation apparatus 13 starts the periodic HTTP request transmissions so that even commands or the like that are generated independently of HTTP requests that the inside mediation apparatus 13 transmits can be transmitted from the Internet-side apparatuses to the intranet-side apparatuses via the firewall as responses to the periodic HTTP requests. Accordingly, the start of the periodic HTTP request transmissions can be considered the start of a specific communication mode in which commands or the like that are generated independently of requests that the inside mediation apparatus 13 transmits are permitted by the firewall to be transmitted therethrough from the outside mediation apparatus 12 to the inside mediation apparatus 13. Hence, the periodic transmission start command can be considered a command instructing the inside mediation apparatus 13 to start the specific communication mode. Further, the periodic HTTP request transmissions can also be said to be set-up operations or preparations for enabling the intranet-side apparatuses to receive, from the Internet-side apparatuses via the firewall, commands or the like that are generated independently of requests that the inside mediation apparatus 13 transmits. The periodic transmission start command is an example of the claimed "specific communication mode start request." Each one of the HTTP requests that the inside mediation apparatus 13 periodically transmits to the outside mediation apparatus 12 is an example of the claimed "instruction request."

Note that the second program 34 may execute the device search process of S92 in response to the second program 34 being installed on the inside mediation apparatus 13 in S84. Here, the second program 34 may execute the device search process of S92 in response to transmitting the request including an initial start notification in S85 or before transmitting this request. In either case, in S87 the second program 34 transmits, to the outside mediation apparatus 12, a request that includes a registration request and a device registration request requesting the first program 24 to register printers 14.

Further, in response to changing the value stored under the item "Communication Start Information" from "Pending" to "Ready" in the second table TB2 of the correlation database DB in S90 to register the second program 34 of the inside mediation apparatus 13 in the correlation database DB, the first program 24 of the outside mediation apparatus 12 may transmit, to the second program 34 of the inside mediation apparatus 13, authentication information, such as a token, that indicates that the second program 34 has been registered in the correlation database DB. The authentication information may be included in the response transmitted to the inside mediation apparatus 13 in S91, for example. In this case, when the second program 34 transmits device IDs acquired in the device search process of S92 to the outside mediation apparatus 12 and requests the first program 24 to register printers 14 in S14, the second program 34 includes authentication information together with the device IDs in the request transmitted in S14. In response to the authentication information being included in the request received from the inside mediation apparatus 13, the first program 24 of the outside mediation apparatus 12 registers, in the first table TB1 of the correlation database DB, the device IDs included in that request. Hence, printers 14 are registered only for second programs 34 already registered in the correlation database DB. In other words, this method prevents printers 14 from being inadvertently registered in the correlation database DB for a second program 34 that is not registered in the correlation database DB.

Effects of the Embodiment

In the embodiment, an instruction from the management server 11 is inputted into (or interpreted by) the printer 14 by the first program 24 of the outside mediation apparatus 12 and the second program 34 of the inside mediation apparatus 13. Accordingly, the management server 11 is capable of managing printers 14 that do not have a function for connecting to the Internet 15 (i.e., a function for communicating directly with the management server 11 and outside mediation apparatus 12). That is, management of printers 14 not possessing a function to connect to the Internet 15 can be performed using the MDM system.

In the embodiment described above, the set information transmitted to the inside mediation apparatus 13 includes: communication information that includes communication settings and at least one of a URL and global IP address; and program files for the second program 34 and the installer. Accordingly, communications between the second program 34 installed on the inside mediation apparatus 13 and the first program 24 of the outside mediation apparatus 12 can be started without requiring the operator to perform communication settings. Thus, the time and effort required for the operator to perform communication settings can be eliminated.

In the embodiment, the item "Communication Start Information" in the correlation database DB (specifically, the second table TB2) is set to "Ready" for an inside mediation apparatus 13 issuing a registration request using a GUID that matches a GUID recorded in the correlation database DB. Further, a device search command and a periodic transmission start command for initiating periodic HTTP requests are issued to the second program 34 of the inside mediation apparatus 13 identified by the GUID recorded in the record whose item "Communication Start Information" has been set to "Ready." Hence, the embodiment can prevent second commands from being transmitted to an inside mediation apparatus 13 that is not registered in the correlation database DB.

In the embodiment, third commands are inputted into printers 14 registered in the correlation database DB (specifically, the first table TB1), i.e., printers 14 identified by the device IDs recorded in the records whose item "Condition Information" has been set to the value "Managing." Hence, the embodiment prevents third commands from being inputted into printers 14 that are not registered in the correlation database DB. In other words, the embodiment prevents the administrator from unintentionally inputting an instruction into the wrong printer 14.

In the embodiment, the first program 24 transmits a device search command (S91) to the second program 34 of an inside mediation apparatus 13 identified by the GUID included in the record of the correlation database DB whose item "Communication Start Information" has been set to "Ready." Accordingly, the device IDs of printers 14 connected to the local area network 16 are registered in the correlation database DB without requiring the administrator or operator to input device IDs via the user interface 26 or user interface 36, thereby eliminating the time and effort required for the administrator or operator to input device IDs.

In the embodiment, only device IDs transmitted from second programs 34 of inside mediation apparatuses 13 whose GUIDs exist in the correlation database DB are registered in the correlation database DB (S15, S17). Accordingly, the embodiment prevents third commands from being inadvertently transmitted to printers 14 connected to second programs 34 of inside mediation apparatuses 13 that are not registered in the correlation database.

In the embodiment, the first program 24 only sets the item "Communication Start Information" in the correlation database DB to "Ready" when a registration request is received from the second program 34 of an inside mediation apparatus 13 having a GUID matching a GUID registered in the correlation database DB. Thus, periodic communications can be performed between the outside mediation apparatus 12 and inside mediation apparatuses 13 registered in the correlation database DB.

In the embodiment, the administrator of the outside mediation apparatus 12 and the operators of the inside mediation apparatuses 13 can display the correlation database DB stored in the memory 22 of the outside mediation apparatus 12 on the display 30 of the outside mediation apparatus 12, the display 40 of the inside mediation apparatus 13, or a display in a mobile terminal or the like in order to confirm details in the correlation database DB.

In the embodiment, in S83 the first program 24 permits installation of the second program 34 only on inside mediation apparatuses 13 that have transmitted a GUID and location information matching a GUID and location information already registered in the correlation database DB. Hence, the embodiment prevents the second program 34 from being installed on an inside mediation apparatus 13 that has transmitted an incorrect combination of a GUID and location information.

<First Variation>

Next, a first variation of the embodiment described above will be described. In the embodiment described above, the operator of the inside mediation apparatus 13 inputs location information, and the location information inputted by the operator is transmitted to the outside mediation apparatus 12 and recorded in the correlation database DB. However, in the first variation, the administrator of the outside mediation apparatus 12 inputs location information. Further, in the first variation, the correlation database DB includes a third table TB3 illustrated in FIG. 2C, in place of the second table TB2. Note that all structures and processes other than those described in the first variation are identical to those in the above-described embodiment.

In response to receiving input by the administrator via the user interface 26, the first program 24 of the outside mediation apparatus 12 displays a registration screen on the display 30 for receiving input of location information. The first program 24 receives the location information that the administrator inputs using the user interface 26.

After receiving the input of the location information, the first program 24 generates a GUID and a key associated with the location information received from the administrator, creates a record that includes the generated GUID and key and the location information, and registers the created record in the third table TB3 of the correlation database DB illustrated in FIG. 2C. Note that a column for the key has been omitted from FIG. 2C.

The third table TB3 of the correlation database DB has the same items as those shown in FIG. 2B. The fact that the item "Installer Download Date" of a record in the third table TB3 does not have a value indicates that, in a branch office identified by the location information registered in the record, the installer has not been yet downloaded to the inside mediation apparatus 13. The fact that the item "Installation Date" of a record in the third table TB3 does not have a value indicates that, in a branch office identified by the location information registered in the record, the second program 34 has not been yet installed on the inside mediation apparatus 13.

The example of FIG. 2C indicates: that, in the A branch, the installer has not been downloaded; that, in the B branch, the installer has been downloaded but the second program 34 has not been installed on the inside mediation apparatus 13; and that in the C branch, the installer has been downloaded and the second program 34 has been installed on the inside mediation apparatus 13.

After generating a record and registering the generated record in the third table TB3 of the correlation database DB, the first program 24 waits until an HTTP request requesting transmission of the installer is received from the inside mediation apparatus 13.

In the meantime, the administrator notifies the operator of each inside mediation apparatus 13 of the corresponding key generated by the first program 24. To notify operators of their keys, the administrator transmits e-mail including the key to each operator, for example. Note that a different key is provided for each operator (each branch), i.e., operators are notified of keys different from one another. The administrator notifies the operator in each branch office identified by location information in the third table TB3 of the key associated with this location information. The key may be configured of alphanumeric characters or any other information that is discernible by the outside mediation apparatus 12.

Once notified of the key, the operator of the inside mediation apparatus 13 transmits, to the outside mediation apparatus 12, an HTTP request that includes an installer transmission request requesting the outside mediation apparatus 12 to transmit the installer, as described in the embodiment (S71 of FIG. 6). In the first variation, this HTTP request includes a key that the operator inputs using the user interface 36.

Upon receiving an HTTP request in S71 that includes a key and an installer transmission request, in S72 the first program 24 of the outside mediation apparatus 12 determines whether the key included in the HTTP request matches a key in one of the records in the third table TB3 of the correlation database DB, i.e., whether the third table TB3 of the correlation database DB has a record including the key included in the HTTP request received in S71.

If the first program 24 determines that the key in the HTTP request does not match any keys in the third table TB3 of the correlation database DB, i.e., that the third table TB3 does not have a record including the key included in the HTTP request (S72: NO), in S73 the first program 24 determines not to transmit the set information to the inside mediation apparatus 13 and transmits an HTTP response to the inside mediation apparatus that includes an authorization denied notification specifying that the first program 24 does not transmit the installer.

When in S73 the browser of the inside mediation apparatus 13 receives an HTTP response that includes an authorization denied notification, the browser displays on the display 40 the notification indicating that the installer is not transmitted.

However, if the first program 24 determines that in the third table TB3 of the correlation database DB has a record including a key matching the key in the HTTP request (S72: YES), in S77 the first program 24 generates set information. In the first variation, the GUID included in the set information is the GUID included in the record having the key included in the HTTP request.

In S78 the first program 24 transmits to the inside mediation apparatus 13 an HTTP response that includes the generated set information. In response to transmitting the set information to the inside mediation apparatus 13, the first program 24 records the date on which the set information has been transmitted under the item "Installer Download Date" of the corresponding record.

Thereafter, the first program 24, the installer, and the second program 34 installed on the inside mediation apparatus 13 execute the process in S79-S92, as described in the embodiment.

Note that, in S72, the first program 24 may determine, in place of the determination described above, whether the third table TB3 of the correlation database DB has a record including the location information corresponding to the key included in the HTTP request received in S71. In this case, when the first program 24 determines that the third table TB3 does not have a record including the location information corresponding to the key included in the HTTP request, in S73 the first program 24 determines not to transmit the set information to the inside mediation apparatus 13 and transmits an HTTP response to the inside mediation apparatus that includes the authorization denied notification. On the other hand, when the first program 24 determines that the third table TB3 has a record including the location information corresponding to the key included in the HTTP request, the first program 24 generates set information in S77 and transmits in S78 an HTTP response to the inside mediation apparatus 13 that includes the generated set information. The key is an example of the claimed "information included in the received installer request."

<Effects of the First Variation>

In the first variation, the administrator can confirm what branches have downloaded the installer and what branches have not yet downloaded the installer by displaying the correlation database DB on the display 30 and viewing the details under the item "Installer Download Date." The administrator can also confirm what branches have installed the second program 34 and what branches have not by displaying the correlation database DB on the display 30 and viewing the item "Installation Date."

Further, since the first program 24 does not transmit the installer to the inside mediation apparatus 13 when the key received from the inside mediation apparatus 13 do not match any key stored in records of the third table TB3 of the correlation database DB, this variation prevents the administrator from transmitting set information to the wrong inside mediation apparatus 13 inadvertently.

Further, by generating the GUID in correlation with the location information, the first variation can prevent location information and GUIDs from being recorded in incorrect correlations in the correlation database DB.

<Second Variation>

In the embodiment described above, the set information including program files for the installer and second program are transmitted to the inside mediation apparatus 13. In the second variation, set information including a program file for the installer is transmitted to the inside mediation apparatus 13, while the program file for the second program 34 is transmitted to the inside mediation apparatus 13 in response to a request from the installer. The second variation will be described next with reference to FIG. 7, wherein process steps identical to those in the embodiment will be designated with the same step numbers to avoid duplicating description.

In the second variation, the first program 24 of the outside mediation apparatus 12 executes the process in S71-S78, as in the embodiment. However, the set information transmitted to the inside mediation apparatus 13 in S78 does not include a program file of the second program 34. In S79 the installer is started on the inside mediation apparatus 13. Once started, in S101 the installer transmits, to the outside mediation apparatus 12, an HTTP request that includes a GUID, location information, and a transmission request requesting the outside mediation apparatus 12 to transmit the second program 34. This HTTP request or the transmission request included therein is an example of the claimed "mediation program transmission request."

In response to receiving the HTTP request including the transmission request from the installer in S101, in S102 the first program 24 of the outside mediation apparatus 12 determines whether the second table TB2 of the correlation database DB has a record that includes a GUID and location information matching the GUID and location information included in the HTTP request received in S101. In other words, the first program 24 determines whether the second program 34 should be transmitted to the inside mediation apparatus 13 that sent the HTTP request in S101.

If the first program 24 determines that the second table TB2 of the correlation database DB has no record including the same GUID and location information as those included in the HTTP request (S102: NO), in S103 the first program 24 transmits to the inside mediation apparatus 13 an HTTP response that includes a transmission denied notification. The transmission denied notification indicates that the second program 34 is not transmitted, i.e., that the first program 24 does not transmit the second program 34. Accordingly, this method prevents the second program 34 from being transmitted to an inside mediation apparatus 13 in response to a transmission request for the second program 34 that has been performed using a GUID and location information not registered in the correlation database DB.

On the other hand, if the first program 24 determines that the second table TB2 of the correlation database DB has a record including the same GUID and location information as the GUID and location information included in the HTTP request (S102: YES), in S104 the first program 24 transmits to the inside mediation apparatus 13 an HTTP response that includes a program file for the second program 34.

In S105 the installer on the inside mediation apparatus 13 installs the second program 34 included in the HTTP response on the inside mediation apparatus 13. Thereafter, the second program 34 installed on the inside mediation apparatus 13 and the first program 24 of the outside mediation apparatus 12 execute the process in S85-S92, as described in the embodiment.

Note that the first program 24 may determine, prior to transmitting the HTTP response including the program file representing the second program 34 (i.e., prior to executing the process of S104), whether the value "Ready" is already registered under the item "Communication Start Information" of the record including the GUID included in the HTTP request received in S101. In this case, when the first program 24 determines that the value "Ready" is already registered under the item "Communication Start Information" of the record including the GUID included in the HTTP request received in S101, the first program 24 transmits the transmission denied notification to the inside mediation apparatus 13 via the firewall as a response to the HTTP request received in S101 and does not transmit the HTTP response including the program file of the second program 34 to the inside mediation apparatus 13. On the other hand, when the first program 24 determines that the value "Ready" has not yet been registered under the item "Communication Start Information" of the record including the GUID included in the HTTP request received in S101, in S104 the first program 24 transmits the HTTP response including the program file for the second program 34 to the inside mediation apparatus 13 via the firewall as a response to the HTTP request received in S101.

<Effects of the Second Variation>

In the second variation, the outside mediation apparatus 12 does not transmit the second program 34 to an inside mediation apparatus 13 when the inside mediation apparatus 13 transmits a GUID and location information not matching a GUID and location information registered in the correlation database DB. Accordingly, this variation can prevent the administrator from inadvertently installing the second program 34 on the wrong inside mediation apparatus 13.

<Other Variations>

In the embodiment described above, the administrator inputs instructions into the outside mediation apparatus 12 via the management server 11. However, the administrator may input instructions directly into the outside mediation apparatus 12. In other words, the administrator need not use the management server 11.

In a case where the management server 11 is not used, the outside mediation apparatus 12 serves as the management server for managing the printers 14. In this case, the administrator inputs a device ID, and instruction information specifying an instruction for the printer 14 designated by the device ID into the outside mediation apparatus 12 using the user interface 26. The first program 24 of the outside mediation apparatus 12 receives the device ID and instruction information inputted by the administrator. By directly inputting instruction information into the outside mediation apparatus 12 in this way, the administrator can update the firmware version of the control program 44 on the printer 14 and modify settings for the printer 14.

Further, in the embodiment described above, the first program 24 receives, from an inside mediation apparatus 13, an installer transmission request requesting to transmit an installer for installing the second program 34 on the inside mediation apparatus 13. However, the first program 24 may receive the installer transmission request from an information-processing apparatus other than the inside mediation apparatus 13, such as a mobile terminal or personal computer. In this case, set information including the installer downloaded into the memory of the information-processing apparatus (such as a mobile terminal or personal computer) different from the inside mediation apparatus 13 is forwarded to the inside mediation apparatus 13 or inputted into the inside mediation apparatus 13 using a portable storage medium. The information-processing apparatus (such as a mobile terminal or personal computer) other than the inside mediation apparatus 13 is an example of the claimed "request source apparatus."

In the embodiment, the set information includes program files for the second program 34 and installer. However, the set information may include a program file for the installer and download information. Here, the download information is information, such as a URL or a download code, for downloading the program file for the second program 34.

Further, in the embodiment, the second command is transmitted from the outside mediation apparatus 12 to the inside mediation apparatus 13 via the firewall by the inside mediation apparatus 13 transmitting an HTTP request and the outside mediation apparatus 12 returning an HTTP response. However, any communication protocol may be used provided that the second command can be transmitted from the outside mediation apparatus 12 to the inside mediation apparatus 13 via the firewall.

For example, the outside mediation apparatus 12 and the inside mediation apparatus 13 may communicate with each other using a communication protocol conforming to XMPP Over BOSH. In this case, the inside mediation apparatus 13 transmits a session creation request according to XMPP Over BOSH to the outside mediation apparatus 12 and then the outside mediation apparatus 12 returns a session creation response to the inside mediation apparatus 13, thereby establishing a session. During the established session, the outside mediation apparatus 12 can transmit the second command to the inside mediation apparatus 13 via the firewall.

In the embodiment, the printers 14 are used as an example of devices being managed. However, the devices under management may be scanners, such as QR code (registered trademark) readers, bar code readers, or handheld scanners; portable sewing machines; and the like.

What is claimed is:

1. A management system comprising:
   a first information-processing apparatus configured to connect with the Internet and comprising a first controller; and
   a second information-processing apparatus configured to connect with a local network and comprising a second controller, the local network being connected to the Internet via a firewall,
   wherein the first controller is configured to perform:
      (a1) receiving an installer request requesting an installer for installing a mediation program;
      (a2) acquiring an address of the first information-processing apparatus; and
      (a3) transmitting, in response to performing the (a1) receiving, set information to a request source apparatus which has issued the installer request, the set information including:
         communication information including the address acquired in the (a2) acquiring; and
         installer information representing the installer,
   wherein, after the first controller performs the (a3) transmitting, the mediation program is installed on the second information-processing apparatus by the installer represented by the installer information included in the set information transmitted in the (a3) transmitting, wherein, after the mediation program is installed on the second information-processing apparatus, a specific communication mode is started using the communication information included in the set information transmitted in the (a3) transmitting, the specific communication mode being a communication mode in which the firewall allows transmission of a specific command from the first information-processing apparatus to the second information-processing apparatus, the specific command including a specific instruction for a device configured to connect with the second information-processing apparatus via the local network, the specific command being generated independently of requests that the second information-processing apparatus transmits, wherein the first controller being configured to further perform:
 (a4) transmitting, under the specific communication mode, the specific command to the second information-processing apparatus via the firewall, wherein the second controller is configured to perform:
 (b1) receiving, under the specific communication mode, the specific command via the firewall; and
 (b2) transmitting, in response to performing the (b1) receiving, a specific response to the specific command to the first information-processing apparatus via the firewall, and wherein the first controller is configured to further perform:
 (a5) receiving the specific response from the second information-processing apparatus via the firewall.

2. The management system according to claim 1, wherein the specific communication mode is started by the second controller in accordance with the installed mediation program.

3. The management system according to claim 1, wherein the first information-processing apparatus further comprises a memory stores therein a correlation database,
 wherein the first controller is configured to further perform:
  (a6) generating, after performing the (a1) receiving, an apparatus ID; and
  (a7) registering, in the correlation database, a record including the generated apparatus ID,
 wherein the set information transmitted in the (a3) transmitting further includes the generated apparatus ID,
 wherein the second controller is configured to further perform:
  (b3) transmitting, after the second program is installed on the second information-processing apparatus, an apparatus registration request to the first information-processing apparatus via the firewall, the apparatus registration request requesting to register the second information-processing apparatus, the apparatus registration request including the apparatus ID included in the set information transmitted in the (a3) transmitting,
 wherein the first controller is configured to further perform:
  (a8) receiving the apparatus registration request from the second information-processing apparatus via the firewall;
  (a9) determining whether a record including the apparatus ID included in the received apparatus registration request exists in the correlation database; and
  (a10) registering, in response to determining that a record including the apparatus ID included in the received apparatus registration request exists in the correlation database, registration permission information in the record including the apparatus ID included in the received apparatus registration request, the registration permission information indicating that registration of the second information apparatus has been permitted,
 wherein the second controller is configured to further perform:
  (b4) transmitting, under the specific communication mode, an instruction request to the first information-processing apparatus via the firewall, the instruction request including the apparatus ID included in the set information transmitted in the (a3) transmitting,
 wherein the first controller is configured to further perform:
  (a11) receiving, under the specific communication mode, the instruction request from the second information-processing apparatus via the firewall, and
 wherein the (a4) transmitting is performed in response to the correlation database having a record including both of: the apparatus ID included in the received instruction request; and the registration permission information.

4. The management system according to claim 3, wherein the first controller is configured to further perform:
 (a12) receiving a device registration request via the firewall from the second information-processing apparatus identified by the apparatus ID included in the record determined in the (a9) determining to exist in the correlation database, the device registration request requesting to register the device, the device registration request including the apparatus ID and a device ID for identifying the device;
 (a13) adding, to the correlation database, a new record for the device identified by the device ID included in the received device registration request;
 (a14) registering, in the new record, the device ID and the apparatus ID which are included in the received device registration request;
 (a15) acquiring instruction information and identification information, the instruction information including a base instruction for the device, the identification information being for identifying the device ID of the device;
 (a16) specifying a device ID on the basis of the acquired instruction information;
 (a17) specifying, from the correlation database, a record including the specified device ID;
 (a18) specifying an apparatus ID included in the specified record;
 (a19) generating the specific command including:
  the specific instruction corresponding to the base instruction included in the acquired instruction information; and
  the device ID specified in the (a16) specifying; and
 (a20) determining whether the apparatus ID specified in the (a18) specifying matches the apparatus ID included in the received instruction request, and
 wherein the (a4) transmitting is performed in response to the first controller determining that the apparatus ID specified in the (a18) specifying matches the apparatus ID included in the received instruction request.

5. The management system according to claim 4, wherein the firewall allows the second information-processing apparatus to receive, from the first information-processing apparatus via the firewall, responses to transmissions from the second information-processing apparatus to the first information-processing apparatus, wherein the first controller is configured to further perform:
(a20) transmitting, in response to receiving in the (a8) receiving the apparatus registration request that includes the apparatus ID included in the record in which the registration permission information is registered in the (a10) registering, a device search instruction to the second information-processing apparatus via the firewall as a response to the apparatus registration request, the device search instruction instructing to acquire the device ID of the device connected via the local network to the second information-processing apparatus, and
wherein, in the (a12) receiving, the device registration request is received as a response to the device search instruction transmitted in the (a20) transmitting.

6. The management system according to claim 4, wherein the first controller is configured to further perform:
(a21) determining, after performing the (a12) receiving, whether a record including the apparatus ID included in the received device registration request exists in the correlation database; and
(a22) transmitting, in response to the first controller determining that a record including the apparatus ID included in the received device registration request does not exist in the correlation database, a registration denied notification via the firewall to the second information-processing apparatus as a response to the received device registration request, the registration denied notification indicating that registration of the device ID included in the received device registration request has been denied, and
wherein the (a13) adding and the (a14) registering are performed in response to the first controller determining that a record including the apparatus ID included in the received device registration request exists in the correlation database.

7. The management system according to claim 3, wherein the firewall allows the second information-processing apparatus to receive, from the first information-processing apparatus via the firewall, responses to transmissions from the second information-processing apparatus to the first information-processing apparatus,
wherein the second controller is configured to further perform:
(b5) transmitting, after the mediation program is installed on the second information-processing apparatus, an initial start notification to the first information-processing apparatus via the firewall,
wherein the first controller is configured to further perform:
(a23) receiving the initial start notification from the second information-processing apparatus via the firewall;
(a24) transmitting, in response to performing the (a23) receiving, an apparatus ID request to the second information-processing apparatus via the firewall as a response to the received initial start notification, the apparatus ID request being a request requesting to transmit the apparatus ID; and
(a25) transmitting, in response to performing the (a10) registering, a specific communication mode start request via the firewall to the first information-processing apparatus as a response to the received apparatus registration request, the specific communication mode start request being a request requesting to start the specific communication mode.

8. The management system according to claim 3, wherein the first controller is configured to further perform:
(a26) generating display data representing the correlation database;
(a27) receiving a display data request; and
(a28) outputting, in response to performing the (a27) receiving, the generated display data.

9. The management system according to claim 3, wherein the firewall allows the second information-processing apparatus to receive, from the first information-processing apparatus via the firewall, responses to transmissions from the second information-processing apparatus to the first information-processing apparatus,
wherein the second controller is configured to further perform:
(b6) transmitting, in accordance with the installer installed on the second information-processing apparatus, a mediation program transmission request to the first information-processing apparatus via the firewall, the mediation program transmission request being a request requesting to transmit the mediation program, the mediation program transmission request including the apparatus ID, and
wherein the first controller is configured to further perform:
(a29) receiving the mediation program transmission request from the second information-processing apparatus via the firewall;
(a30) determining, in response to performing the (a29) receiving, whether the registration permission information is registered in the record including the apparatus ID included in the received mediation program transmission request;
(a31) transmitting, in response to determining that the registration permission information is registered in the record including the apparatus ID included in the received mediation program transmission request, a transmission denied notification to the second information-processing apparatus via the firewall as a response to the received mediation program transmission request, the transmission denied notification indicating that transmission of the mediation program has been denied; and
(a32) transmitting, in response to determining that the registration permission information is not registered in the record including the apparatus ID included in the received mediation program transmission request, the mediation program to the second information-processing apparatus via the firewall as a response to the received mediation program transmission request.

10. The management system according to claim 3, wherein the firewall allows the second information-processing apparatus to receive, from the first information-processing apparatus via the firewall, responses to transmissions from the second information-processing apparatus to the first information-processing apparatus,
wherein the first controller is configured to further perform:
(a33) registering location information in the record including the generated apparatus ID is registered,
wherein the second controller is configured to further perform:

(b7) transmitting, in accordance with the installer installed on the second information-processing apparatus, an installation permission request to the first information-processing apparatus via the firewall, the installation permission request requesting to permit installation of the mediation program on the second information-processing apparatus, the installation permission request including:
  location information of the second information processing-apparatus; and
  the apparatus ID included in the set information transmitted in the (a3) transmitting, and
wherein the first controller is configured to further perform:
  (a34) determining, in response to receiving the installation permission request, whether the correlation database has a record including both of the location information and the apparatus ID which are included in the received installation permission request;
  (a35) transmitting, in response to determining that the correlation database does not have a record including both of the location information and the apparatus ID which are included in the received installation permission request, an installation denied notification to the second information-processing apparatus via the firewall as a response to the received installation permission request, the installation denied notification indicating that installation of the mediation program has been denied; and
  (a36) transmitting, in response to determining that the correlation database has a record including both of the location information and the apparatus ID which are included in the received installation permission request, an installation allowed notification to the second information-processing apparatus via the firewall as a response to the received installation permission request, the installation allowed notification indicating that installation of the mediation program has been permitted.

11. The management system according to claim 1, wherein the first information-processing apparatus further comprises a memory in which a correlation database is stored,
wherein the first controller is configured to further perform:
  (a37) receiving one or more pieces of location information;
  (a38) generating, in response to performing the (a37) receiving, one or more apparatus IDs corresponding to respective ones of the one or more pieces of location information;
  (a39) adding, to the correlation database, one or more records corresponding to respective ones of the one or more apparatus IDs generated in the (a38) generating;
  (a40) registering, in each of the one or more records added in the (a40) adding, the corresponding apparatus ID and the corresponding location information in association with each other;
  (a41) determining, after receiving the installer request in the (a1) receiving, whether the correlation database has a record including the location information corresponding to information included in the received installer request; and
  (a42) determining, in response to determining that the correlation database does not have a record including the location information corresponding to information included in the received installer request, not to perform the (a3) transmitting, and
wherein the (a3) transmitting is performed in response to the first controller determining that the correlation database has a record including the location information corresponding to information included in the received installer request.

12. The management system according to claim 11, wherein the first controller is configured to further perform:
  (a43) registering, in response to performing the (a3) transmitting, transmission completion information in the record determined in the (a41) determining to include the location information corresponding to the information included in the received installer request, the transmission completion information indicating that the set information has been transmitted;
  (a44) generating display data representing the correlation database;
  (a45) receiving a display data request; and
  (a46) outputting, in response to performing the (a45) receiving, the generated display data.

13. The management system according to claim 4, wherein the first controller is configured to further perform:
  (a47) requesting, via the Internet, a management server to register the device ID, the management server being configured to connect with the Internet; and
wherein the (a15) acquiring is performed after the first controller performs the (a47) requesting,
wherein, in the (a15) acquiring, the instruction information is acquired from the management server,
wherein the first controller is configured to further perform:
  (a48) transmitting specific information to the management server via the Internet as a response to the instruction information, the specific information being information corresponding to the specific response received in the (a5) receiving, and
wherein the identification information included in the instruction information is the device ID.

14. A non-transitory computer-readable storage medium storing computer-readable instructions for a first information-processing apparatus, the first information-processing apparatus being configured to connect with the Internet and comprising a processor, the computer-readable instructions, when executed by the processor, causing the first information-processing apparatus to perform:
  (a1) receiving an installer request requesting an installer for installing a mediation program on a second information-processing apparatus, the second information-processing apparatus being configured to connect with a local network, the local network being connected to the Internet via a firewall;
  (a2) acquiring an address of the first information-processing apparatus; and
  (a3) transmitting, in response to performing the (a1) receiving, set information to a request source apparatus which has issued the installer request, the set information including:
    communication information including the address acquired in the (a2) acquiring; and
    installer information representing the installer,
  wherein, after the first controller performs the (a3) transmitting, the mediation program is installed on the second information-processing apparatus by the installer represented by the installer information included in the set information transmitted in the (a3) transmitting, wherein, after the mediation program is installed on the second information-processing apparatus, a specific communication mode is started using the communication information included in the set information transmitted in the (a3) transmitting, the specific communication mode being a communication mode in which the firewall allows transmission of a specific command from the first information-processing apparatus to the second information-processing apparatus, the specific command including a specific instruction for a device configured to connect with the second information-processing apparatus via the local network, the specific command being generated independently of requests that the second information-processing apparatus transmits, and wherein the first controller being configured to further perform:
- (a4) transmitting, under the specific communication mode, the specific command to the second information-processing apparatus via the firewall; and
- (a5) receiving a response to the specific command from the second information-processing apparatus via the firewall.

15. A method for managing a device, comprising:
under control of a first information-processing apparatus configured to connect with the Internet,
- (a1) receiving, an installer request requesting an installer for installing a mediation program on a second information-processing apparatus, the second information-processing apparatus being configured to connect with a local network, the local network being connected to the Internet via a firewall;
- (a2) acquiring an address of the first information-processing apparatus;
- (a3) transmitting, in response to performing the (a1) receiving, set information to a request source apparatus which has issued the installer request, the set information including: communication information including the address acquired in the (a2) acquiring; and installer information representing the installer, wherein, after the first controller performs the (a3) transmitting, the mediation program is installed on the second information-processing apparatus by the installer represented by the installer information included in the set information transmitted in the (a3) transmitting, wherein, after the mediation program is installed on the second information-processing apparatus, a specific communication mode is started using the communication information included in the set information transmitted in the (a3) transmitting, the specific communication mode being a communication mode in which the firewall allows transmission of a specific command from the first information-processing apparatus to the second information-processing apparatus, the specific command including a specific instruction for a device configured to connect with the second information-processing apparatus via the local network, the specific command being generated independently of requests that the second information-processing apparatus transmits;
- (a4) transmitting, under the specific communication mode, the specific command to the second information-processing apparatus via the firewall; and
- (a5) receiving a response to the specific command from the second information-processing apparatus via the firewall.

* * * * *